(12) United States Patent
Bergeron

(10) Patent No.: US 6,685,396 B1
(45) Date of Patent: *Feb. 3, 2004

(54) METHOD AND APPARATUS FOR SUCTION ANCHOR AND MOORING DEPLOYMENT AND CONNECTION

(76) Inventor: Billy J. Bergeron, 233 Bergeron Rd., Arnaudville, LA (US) 70512

( * ) Notice: Subject to any disclaimer, the term of this patent is extended or adjusted under 35 U.S.C. 154(b) by 0 days.

This patent is subject to a terminal disclaimer.

(21) Appl. No.: 10/401,485

(22) Filed: Mar. 28, 2003

Related U.S. Application Data

(62) Division of application No. 10/186,059, filed on Jun. 27, 2002, now abandoned, which is a division of application No. 09/715,461, filed on Nov. 16, 2000, now Pat. No. 6,457,908.

(51) Int. Cl.⁷ ............... E02D 5/74; B63B 21/27; B63B 21/50
(52) U.S. Cl. ............... 405/224; 405/195.1; 405/172; 405/226; 114/296
(58) Field of Search ............... 405/224, 226, 405/228, 172, 224.1–224.4, 195.1; 114/230, 230.26, 230.13, 296, 293, 294, 264, 265; 403/353; 166/352

(56) References Cited

U.S. PATENT DOCUMENTS

| | | | | |
|---|---|---|---|---|
| 4,318,641 A | * | 3/1982 | Hogervorst | 405/224 |
| 4,432,671 A | * | 2/1984 | Westra et al. | 405/226 |
| 4,558,744 A | * | 12/1985 | Gibb | 405/226 |
| 4,572,304 A | * | 2/1986 | Mahar et al. | 114/296 |
| 4,575,282 A | * | 3/1986 | Pardue et al. | 405/228 |
| 4,721,415 A | * | 1/1988 | Shatto | 405/224.1 |
| 4,807,899 A | * | 2/1989 | Belcher | 280/477 |
| 4,830,541 A | * | 5/1989 | Shatto | 405/226 |
| 5,188,054 A | * | 2/1993 | Jacobs, Jr. | 114/250 |
| 5,390,618 A | * | 2/1995 | Wolff et al. | 114/230.23 |
| 5,704,307 A | * | 1/1998 | Treu et al. | 114/230.13 |
| 5,704,732 A | * | 1/1998 | Horton, III | 405/228 |
| 5,836,061 A | * | 11/1998 | Castillo et al. | 403/353 |
| 6,009,825 A | * | 1/2000 | Fulton et al. | 114/296 |
| 6,332,500 B1 | * | 12/2001 | Ellefsen et al. | 166/352 |
| 6,457,908 B1 | * | 10/2002 | Bergeron | 405/224 |

FOREIGN PATENT DOCUMENTS

JP 58149886 * 9/1983 ............ 114/296

* cited by examiner

Primary Examiner—Jong-Suk (James) Lee
(74) Attorney, Agent, or Firm—James L. Jackson; Andrews Kurth LLP

(57) ABSTRACT

A method and apparatus for deployment of mooring systems for buoyant marine structures such as mobile offshore drilling units (MODU's) and for connecting the same to the mooring lines thereof. An anchor handling vessel carries one or more anchors each having a deployment connection and a mooring connection and individually moves each anchor over its stem roller and deploys it to the sea bottom for installation. A handling line is disconnected by ROV from the deployment connection and is moved from the deployment connection to the mooring connection so as to become the main mooring line. Syntactic buoys are then mounted on the main mooring line for elevating it above the sea bottom for recovery. When MODU stationing is desired the anchor handling vessel then recovers the surface buoy and connects to the rig mooring line using a short section of mooring chain. A J-chaser stopper device is then installed in the mooring string and is connected to the mooring line of the MODU by a short section of chain. The J-chaser lowers the mooring string, completing the mooring connection between the anchor and the MODU. A plurality of mooring strings, typically eight, are deployed in this manner to properly station the MODU. Disconnection of the MODU is accomplished essentially by the reverse of the above deployment procedure.

4 Claims, 20 Drawing Sheets

METHOD AND APPARATUS FOR SUCTION ANCHOR AND MOORING DEPLOYMENT AND CONNECTION

This application is a divisional of U.S. patent application Ser. No. 10/106,059, filed Jun. 27, 2002, abandoned, which is a divisional of U.S. patent application Ser. No. 09/715,461, filed Nov. 16, 2000, U.S. Pat. No. 6,457,908.

BACKGROUND OF THE INVENTION

1. Field of the Invention

This invention relates generally to mooring line connections for subsea operations, particularly for suction anchor pile moorings. More particularly, this invention concerns a wire socket connector mechanism which facilitates subsea connection and reconnection of mooring lines of semi-submersible drilling rigs, production and drilling platforms and the like to suction anchor piles and other anchor devices. This invention also concerns deployment and installation of suction anchor piles and a mooring wire assembly with retrieval buoys and sling on one of its ends. The invention also concerns addition of buoys to mooring wire sections and connecting the mooring wire to a vessel to be moored. The procedure also concerns the mooring wire, buoy recovery, wire retrieval and suction anchor pile recovery and a procedure for recovering mooring wires and other apparatus.

2. Description of the Prior Art

Present procedures for installing subsurface anchors and establishing mooring the connection between the anchors and a semisubmersible drilling rig has required the presence of two service vessels, one an anchor handling vessel equipped with an A-frame type hoist for transporting the anchor and for lifting the anchor. The second service vessel is used to pull the hoisted anchor from the anchor handling vessel and to assist the anchor handling vessel in deployment of the anchor. When a large A-frame type hoisting mechanism is utilized for lifting the anchor from the anchor handling vessel, particularly in rough sea conditions, the heavy and bulky anchor and its peripheral equipment may swing to and from and may strike and damage other equipment in the immediate vicinity of the A-frame type hoisting mechanism. Additionally, since personnel will typically be required to ascend the A-frame type hoisting mechanism, such as to string wire rope and conduct other activities, the heavy swinging load of an anchor that is supported by the hoist constitutes and the movement of the A-frame hoist along with the vessel present significant hazards to the safety of workers whether present on the deck of the vessel or on the A-frame hoist or in the rigging of the hoist. It is desirable therefore to provide a system for transportation and deployment of subsea anchors and mooring lines which does not constitute a safety hazard for workers. It is also desirable to provide a system for transportation and deployment of subsea anchors and mooring lines and which minimizes the potential for damage to the vessel and its equipment even under circumstances where the sea conditions are rough during anchor deployment and recovery and during deployment and recovery of mooring lines. It is also desirable to provide a system for the handling, deployment and recovery of subsea anchors and installation and recovery of mooring lines which effectively minimizes the cost of stationing and mooring a semisubmersible vessel such as a drilling rig for well drilling operations.

Another significant disadvantage of using two service vessels for anchor transportation, handling and deployment is simply the duplication of costs when two vessels are utilized rather than a single vessel. It is desirable therefore to provide a system, utilizing a single anchor handling vessel, which is capable of transporting, deploying and retrieving subsea anchors in deep water conditions and is also capable of accomplishing connection and disconnection of mooring lines to permit drilling vessels to be quickly and efficiently stationed and restationed, thus conserving not only service vessel time and consequent cost but also conserving drilling vessel time and consequent cost.

The common feature of the present invention is the installation of a mooring anchor without the mooring line attached at the time of deployment and embedment in the sea bottom. Prior to the invention of the subsea connector shown in FIGS. 21–25 hereof it was not possible to install an anchor in deeper water without the mooring line being attached to the anchor at the time of deployment. Heretofore, there has been no practical means of connecting a mooring line to an anchor embedded in the sea bottom in water depths that could not be manually accessed.

There is considerable advantage in being able to install mooring anchors without the mooring line attached. Several styles of advanced high holding power anchors for use in deeper water depths need to be deployed and embedded with a deployment line that has an attachment point apart from the preferred point of attachment of the mooring line. Previously, it had been necessary to deploy such anchors with both a deployment line extending from the principal deployment vessel and a separate mooring line extending from a second deployment vessel in order to prevent the two lines from becoming entangled with one another. The requirement for the use of two anchor handling and deployment vessels has added considerable cost and logistical difficulty to the anchor and mooring system deployment process. The method of mooring set forth herein is designed to specifically avoid this difficulty. In vessel anchoring situations such as is disclosed in U.S. Pat. No. 4,347,012 of Glidden the basic anchor base structure "A" must be deployed and installed at the sea bed with the pull line "P" attached or by threading the pull line P about the pulleys 18 and 19 and through the side opening 25 after the anchor base has been installed. While this activity can be accomplished in shallow water conditions, such as by a diver, it cannot be accomplished when water depth exceeds the working depth of divers. Thus, for deep water anchor deployment and installation, the anchor system of Glidden would require the use to two vessels, one vessel to handle the anchor base and another vessel to manipulate the pull line and prevent rotation of the anchor base due to cable unwinding during deployment and to thus keep the pull line from tangling with the anchor deployment line. The present invention is designed to promote anchor deployment with a single anchor handling and without any line being attached other than the anchor deployment line. Consequently, wound cable may be used for anchor deployment and anchor rotation by cable unwinding during deployment does not detract from the deployment procedure, since no cable fouling can be caused by anchor rotation. The present invention permits efficient single vessel, single line anchor deployment and also facilitates simple and efficient deployment line disconnection and mooring line connection via the use of ROVs. Later, when vessel mooring is no longer needed, the present invention also facilitates mooring line disconnection and anchor retrieval, again through the use of a single vessel and a single lifting line which permits rotation of the anchor during recovery from the sea bed.

There are several principal features of the mooring method of the present invention that prove to be practical and advantageous, the most simple of which is the deployment of the anchor with a single line from a single vessel with no mooring line attached as shown in FIGS. 14 and 15. Once the anchor is embedded, the mooring line is attached as shown in FIG. 16 by the same or another vessel and laid on the sea bed or attached to a buoy which can be retrieved later, or the mooring line is attached to the anchor at some later date. This method provides the most efficient installation of the anchor and the most flexible arrangement for mooring line attachment to the anchor and connection to the marine structure to be moored.

The present invention envisions the use of Remote Operated Vehicles, called ROV's to operate the connector that connects the mooring line to the installed anchor. In fact, the connector is specifically designed to handle the mooring loads and be operated by the ROV. As such, the connector is a unique invention and this method of mooring that it enables is also a unique invention.

SUMMARY OF THE INVENTION

It is a principal feature of the present invention to provide a novel system for anchor transportation, handling deployment and recovery which is accomplished by a single anchor handling vessel.

It is also desirable to provide a system for anchor transportation, handling deployment and recovery and which enables a plurality of subsea anchors to be simultaneously transported and permits the anchors to be individually deployed and recovered even under conditions of rough seas.

It is another feature of the present invention to provide a novel system for anchor transportation, handling, deployment and recovery wherein the anchors, particularly suction piles, are moved over the stem roller of a single anchor handling vessel during deployment and retrieval operations.

It is an even further feature of the present invention to provide a novel system for anchor transportation, handling, deployment and recovery which facilitates a unique single vessel handling system enabling anchor connections and disconnections with a minimum of expended time and with a minimum of cost.

The common feature of the present invention is the installation of a mooring anchor without the mooring line attached at the time of deployment and embedment in the sea bottom. Prior to the invention of the subsea connector shown in FIGS. 21–25 hereof it was not possible to install an anchor in deeper water without the mooring line being attached to the anchor at the time of deployment. Heretofore, there has been no practical means of connecting a mooring line to an anchor embedded in the sea bottom in water depths that could not be manually accessed.

There is considerable advantage in being able to install mooring anchors without the mooring line attached. Several styles of advanced high holding power anchors for use in deeper water depths need to be deployed and embedded with a deployment line that has an attachment point apart from the preferred point of attachment of the mooring line. Previously, it had been necessary to deploy such anchors with both a deployment line extending from the principal deployment vessel and a separate mooring line extending from a second deployment vessel in order to prevent the two lines from becoming entangled with one another. The requirement for the use of two anchor handling and deployment vessels has added considerable cost and logistical difficulty to the anchor and mooring system deployment process. The method of mooring set forth herein is designed to specifically avoid this difficulty. In vessel anchoring situations such as is disclosed in U.S. Pat. No. 4,347,012 of Glidden the basic anchor base structure "A" must be deployed and installed at the sea bed with the pull line "P" attached or by threading the pull line P about the pulleys 18 and 19 and through the side opening 25 after the anchor base has been installed. While this activity can be accomplished in shallow water conditions, such as by a diver, it cannot be accomplished when water depth exceeds the working depth of divers. Thus, for deep water anchor deployment and installation, the anchor system of Glidden would require the use to two vessels, one vessel to handle the anchor base and another vessel to manipulate the pull line and prevent rotation of the anchor base due to cable unwinding during deployment and to thus keep the pull line from tangling with the anchor deployment line. The present invention is designed to promote anchor deployment with a single anchor handling and without any line being attached other than the anchor deployment line. Consequently, wound cable may be used for anchor deployment and anchor rotation by cable unwinding during deployment does not detract from the deployment procedure, since no cable fouling can be caused by anchor rotation. The present invention permits efficient single vessel, single line anchor deployment and also facilitates simple and efficient deployment line disconnection and mooring line connection via the use of ROVs. Later, when vessel mooring is no longer needed, the present invention also facilitates mooring line disconnection and anchor retrieval, again through the use of a single vessel and a single lifting line which permits rotation of the anchor during recovery from the sea bed.

There are several principal features of the mooring method of the present invention that prove to be practical and advantageous, the most simple of which is the deployment of the anchor with a single line from a single vessel with no mooring line attached as shown in FIGS. 14 and 15. Once the anchor is embedded, the mooring line is attached as shown in FIG. 16 by the same or another vessel and laid on the sea bed or attached to a buoy which can be retrieved later, or the mooring line is attached to the anchor at some later date. This method provides the most efficient installation of the anchor and the most flexible arrangement for mooring line attachment to the anchor and connection to the marine structure to be moored.

The present invention envisions the use of Remote Operated Vehicles, called ROV's to operate the connector that connects the mooring line to the installed anchor. In fact, the connector is specifically designed to handle the mooring loads and be operated by the ROV. As such, the connector is a unique invention and this method of mooring that it enables is also a unique invention.

Briefly, the various objects and features of the present invention are realized by providing an anchor handling vessel which is equipped to mount a plurality of subsea anchors along the sides of the deck, leaving the central part of the deck for anchor handling. The vessel is equipped with a track mechanism which is used to move a selected anchor laterally from its tethered position along a side of the vessel and to position the anchor in substantial alignment with the longitudinal centerline of the vessel deck. The track mechanism is also operated to move the selected anchor linearly toward the stem roller of the vessel and to launch the anchor over the stem roller so that it is suspended by a support and handling line or lines. The suction pile type anchor is lowered to its desired position and installed in conventional manner. The anchor handling line may be utilized as a section of the mooring line, in which case its connection for lifting and supporting the anchor is released and the line is moved to a mooring connection of the anchor and reconnected. A remote operating vehicle (ROV) may be used for this purpose or a remotely operated quick-release connector may be utilized to release the anchor support and handling connection and to establish the mooring connection.

BRIEF DESCRIPTION OF THE DRAWINGS

The various objects and advantages of this invention will become apparent to those skilled in the art upon an understanding of the following detailed description of the invention, read in light of the accompanying drawings which are made a part of this specification and in which: In the Drawings.

DETAILED DESCRIPTION OF PREFERRED EMBODIMENT

Figure 1:
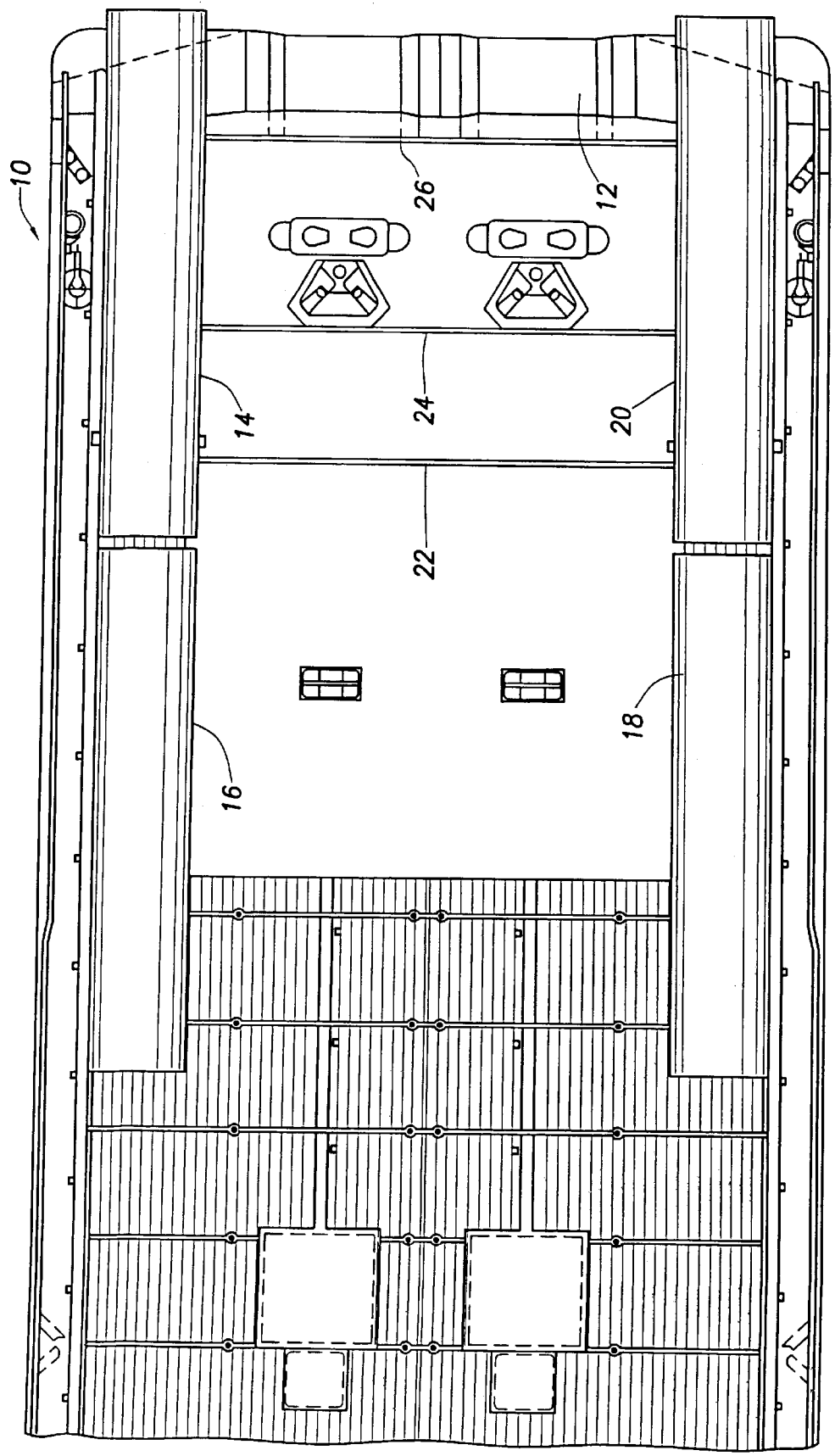
FIG. 1 is a plan view showing the stem section of an anchor handling vessel designed for suction anchor deployment, mooring wire deployment and handling and showing four suction anchors in loaded position on the stem of the vessel in preparation for deployment thereof.
Figure 2:
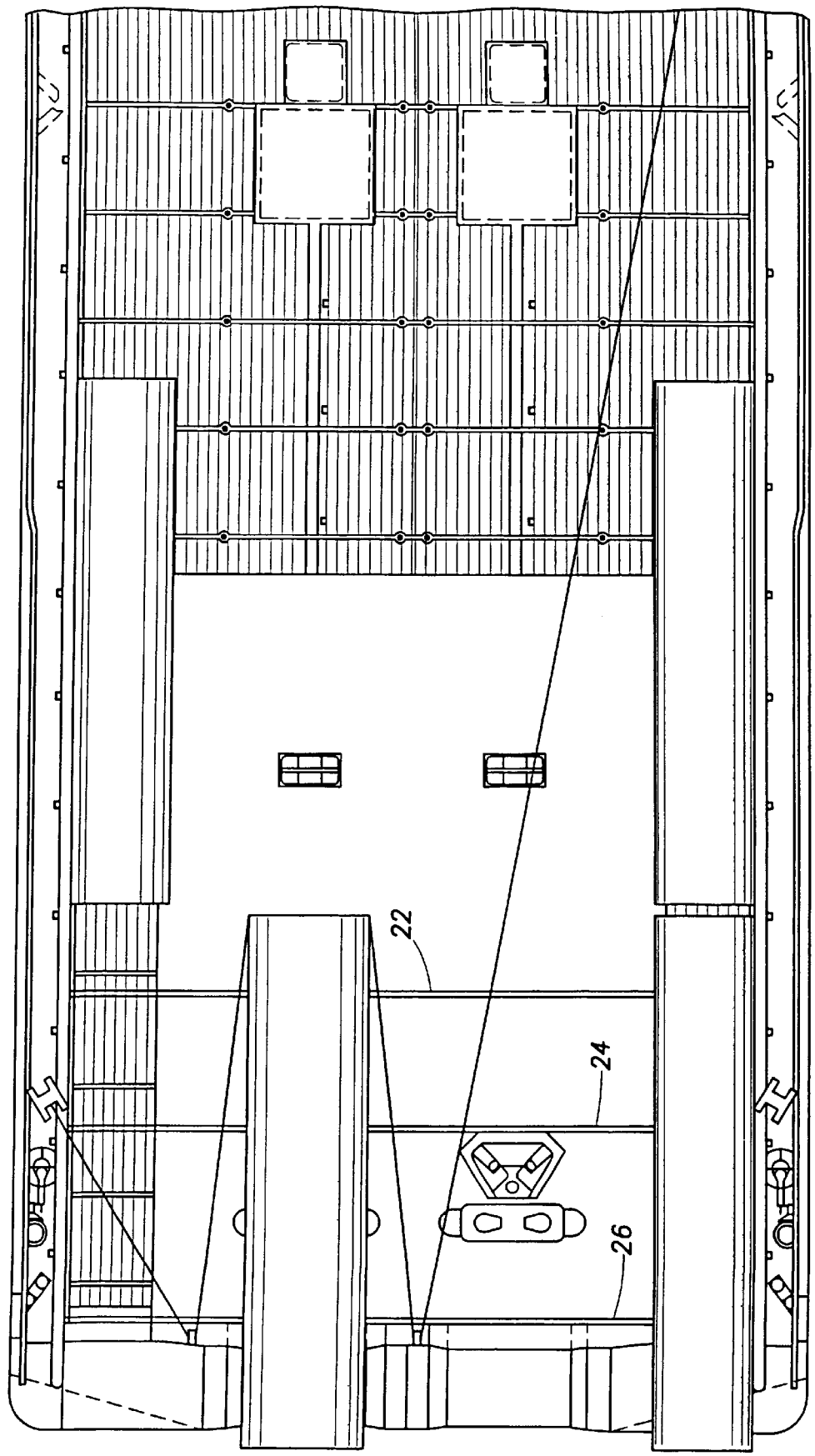
FIG. 2 is a plan view similar to that of FIG. 1 and showing one of the suction anchors having been maneuvered to its deployment position with respect to the stem roller of the vessel in preparation for suction anchor deployment.
Figure 3:
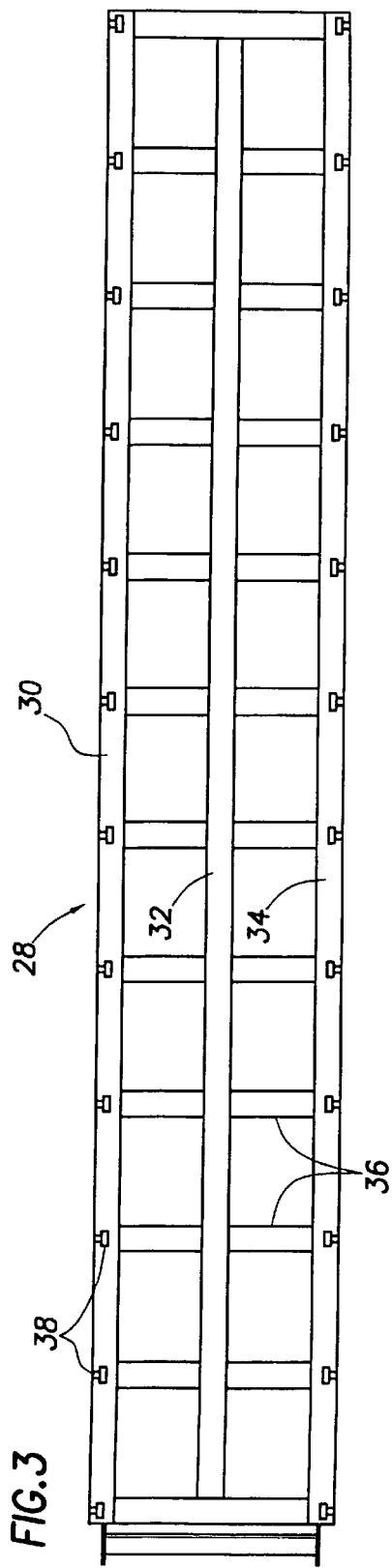
FIG. 3 is a plan view of a track roller assembly for on deck handling of a suction anchor pile for deployment or retrieval operations.
Figure 4:
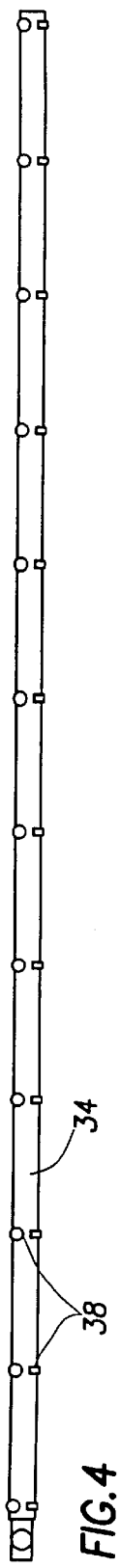
FIG. 4 is an elevational view of the track roller assembly of FIG. 3.
Figure 5:
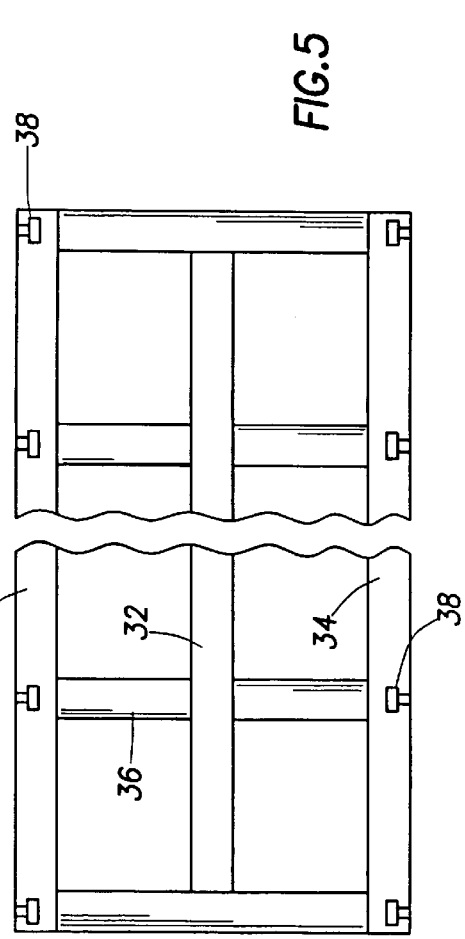
FIG. 5 is a partial plan view of the track roller assembly of FIG. 3 showing the top and bottom roller arrangements thereof in detail.
Figure 6:
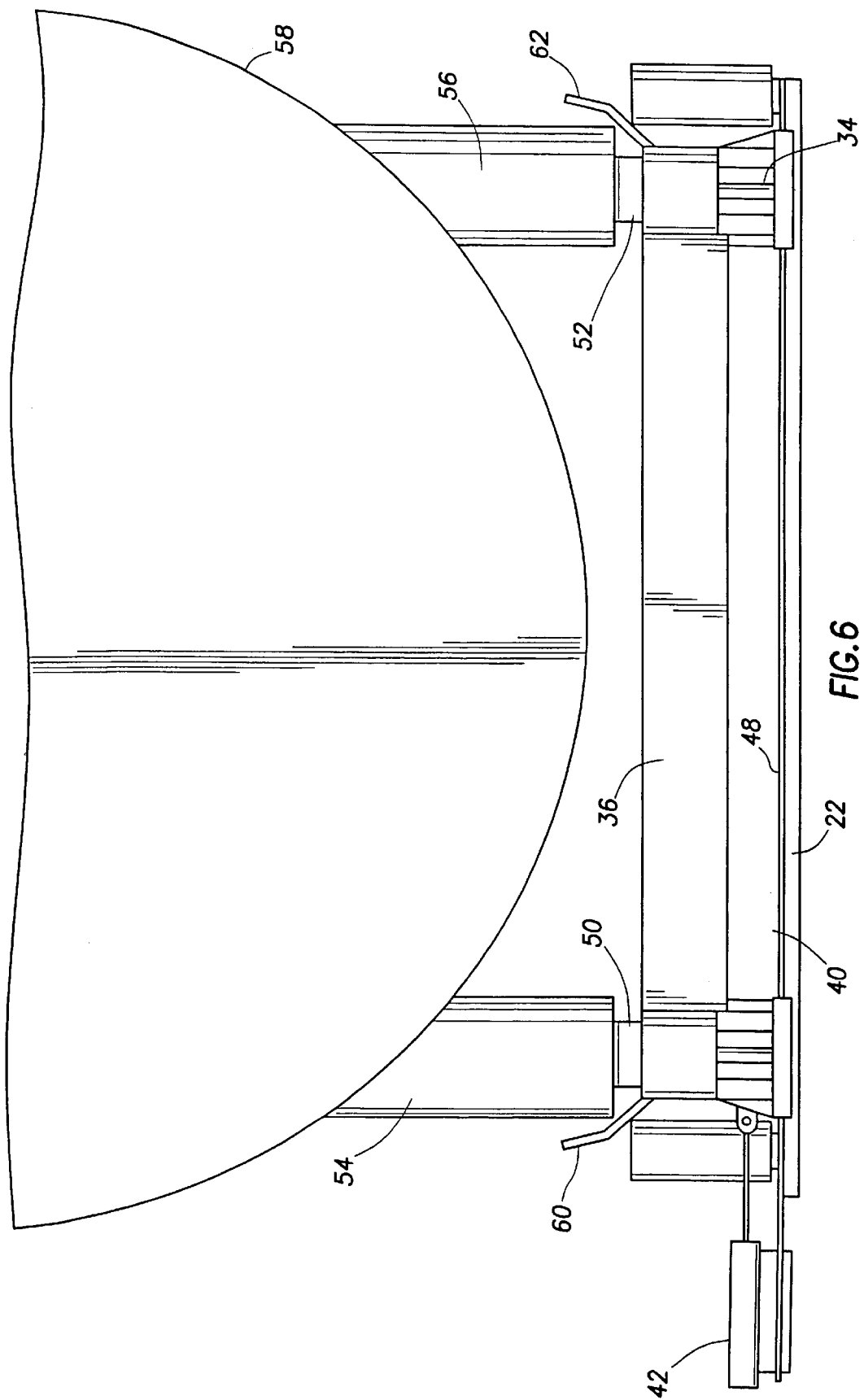
FIG. 6 is an end elevational view of the track roller assembly of FIGS. 3–5 and showing a hydraulic jacking mechanism for lateral movement of the track roller assembly.
Figure 7:
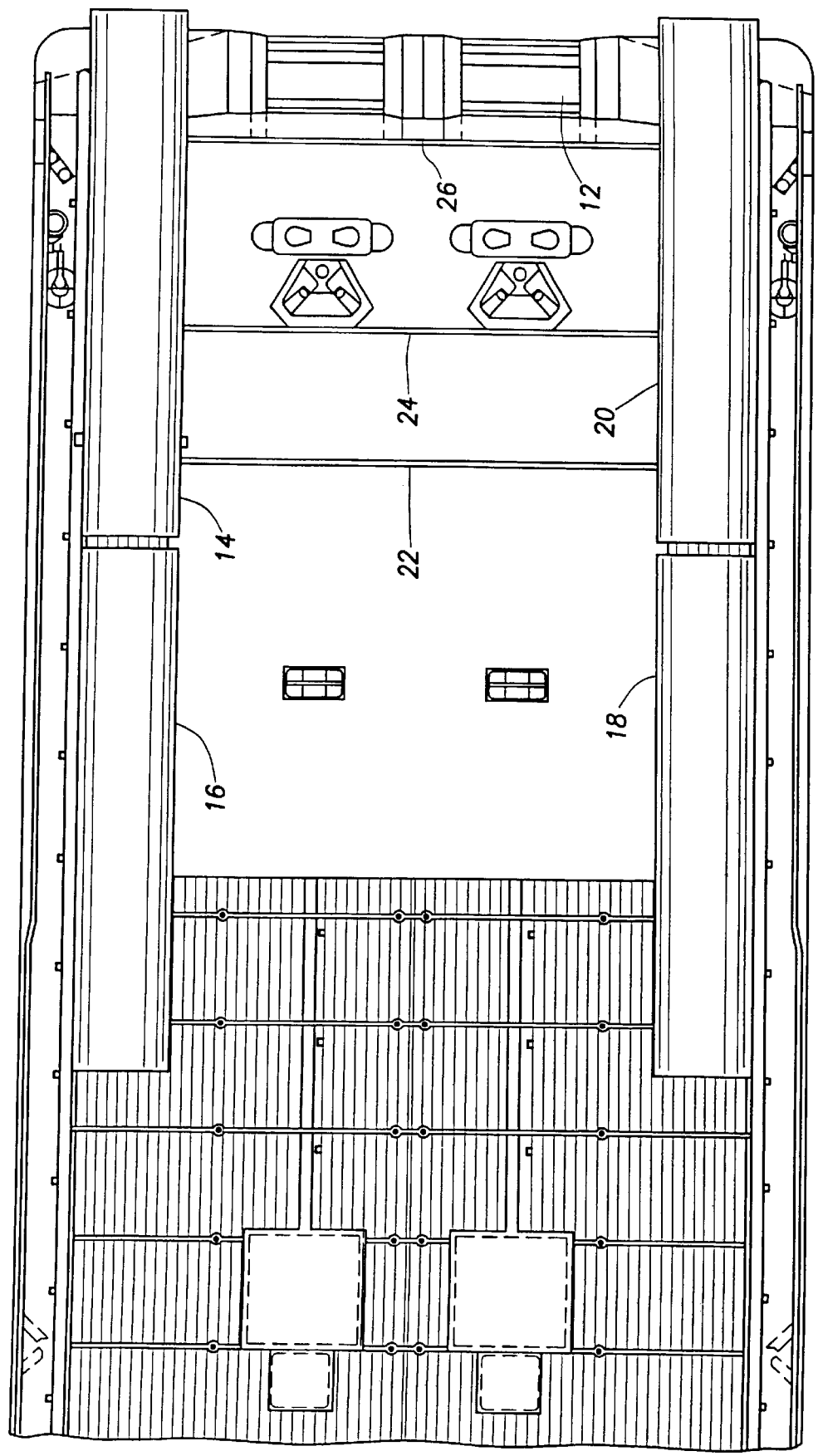
FIG. 7 is a plan view similar to that shown in FIGS. 1 and 2 and showing I-beam tracks mounted on the anchor handling vessel deck to permit transverse movement of track rollers during deployment or recovery operations for suction anchor piles.

Referring now to the drawings and first to FIG. 1, the stern deck of an anchor handling vessel, also referred to therein to an anchor handling vessel, is shown generally at 10 and incorporates a stern roller 12 over which suction anchor piles and other apparatus is launched. The stern of the anchor handling vessel is pitted to receive 4 suction anchor piles shown at 14, 16, 18 and 20 which are secured to the anchor handling vessel by individual anchor handling assemblies which are shown in greater detail in FIGS. 3–6. The deck of the vessel is provided with transverse beams or rails 22, 24 and 26, one which being shown in FIG. 6 at 22. Track roller assemblies are provided as shown in FIGS. 3, 4 and 5 with one of the track roller assemblies, shown generally at 28 in FIG. 3, having parallel track members 30, 32 and 34 which are interconnected by transverse structural members 36. Roller assemblies 38 and 39 are mounted to the outer parallel structural members 30 and 34 and to the transverse structural members as is more clearly evident from the end view of FIG. 6. Rollers 50 and 52 are mounted to the parallel structural members 30 and 34 for rotation and are provided for contact by parallel support members 54 and 56 of an anchor cradle 58 to thereby permit linear movement of the cradle and the suction anchor pile supported thereby for launching the suction anchor pile overboard the stem roller of the vessel. Alternatively, the structural support members 54 and 56 may comprise elongate supports that are fixed along a side of the suction anchor pile. The suction anchor pile 58 is supported directly by the rollers 50 and 52 to permit its effective launching and retrieval. Lateral guide members 60 and 62 are welded or otherwise fixed to the outer parallel structural members 30 and 34 and function to maintain a proper relationship of the support members 54 and 56 to the rollers 50 and 52 as the suction anchor pile is moved linearly during its launching or retrieval. Guide members 42 and 42 are disposed in guiding engagement with the upper flange 40 of the I-beam 22 and thus permit the track roller assembly to be moved laterally relative to the deck of the anchor handling vessel 10 to position a track roller assembly for launching an anchor device or for receiving an anchor device during its recovery. This lateral positioning movement of the track roller assembly is controlled by at least one lateral positioning actuator such as a hydraulic jack assembly 44 shown in FIG. 6. One or more lift assemblies, such as the hydraulic lift assemblies 45 and 46, connected to the track roller assemblies, are positioned for actuating engagement with the upper surface 48 of the I-beam 22 and are controllably energized to lift the roller track assembly and the anchor device supported thereby sufficiently to permit the actuator assembly 44 to accomplish lateral movement of the track roller assembly.

Figure 8:
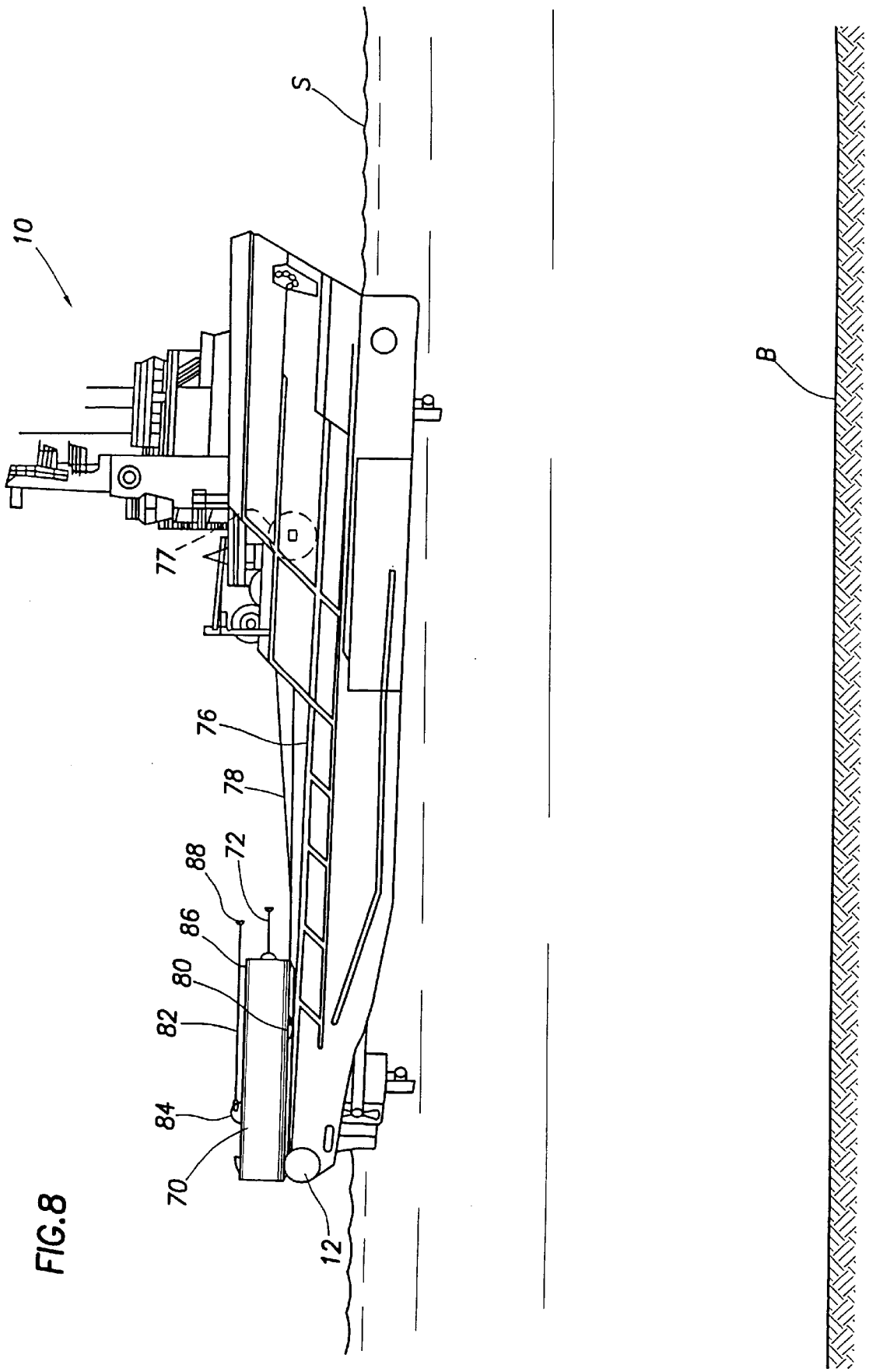
FIG. 8 is side elevational view of a service vessel showing a suction anchor pile in position for launching over the stem roller of the vessel and showing an initial arrangement of handling lines.

Referring now to FIG. 8 and subsequent figures, the anchor handling vessel 10 is shown with one of the suction anchor piles 70 located with its lower end at the stem roller 12 of the vessel and with its deployment sling 72 being connected by a wire socket connector shown generally at 74 to the upper winch wire 76 of the vessel winch system which is the lifting and lowering winch 77. The wire socket connector 74 is provided with a connector element 75, such as a wire socket element of the type and function shown in FIGS. 24 and 25 hereof. Another winch wire 78 is shown to be connected to a suction anchor pile overboarding deployment sling 80 that is located intermediate the upper and lower ends of the suction anchor pile. The suction anchor pile is shown with its main mooring wire extension 82 secured to a mooring wire connector 84 of the suction anchor pile and with its upper end being secured against one side of the suction anchor pile by a mooring wire positioning lock 86. At the upper end of the main mooring wire extension, there is provided a tapered socket member 88, which may be of the type shown in FIGS. 12 and 13 thereof. The deployment sling 72 is connected to the suction anchor pile 70 by a deployment connector 73 which may be in the form of an elastomer support to provide a cushioning capability between the suction anchor pile and the anchor lifting and handling or deployment sling 72.

Figure 9:
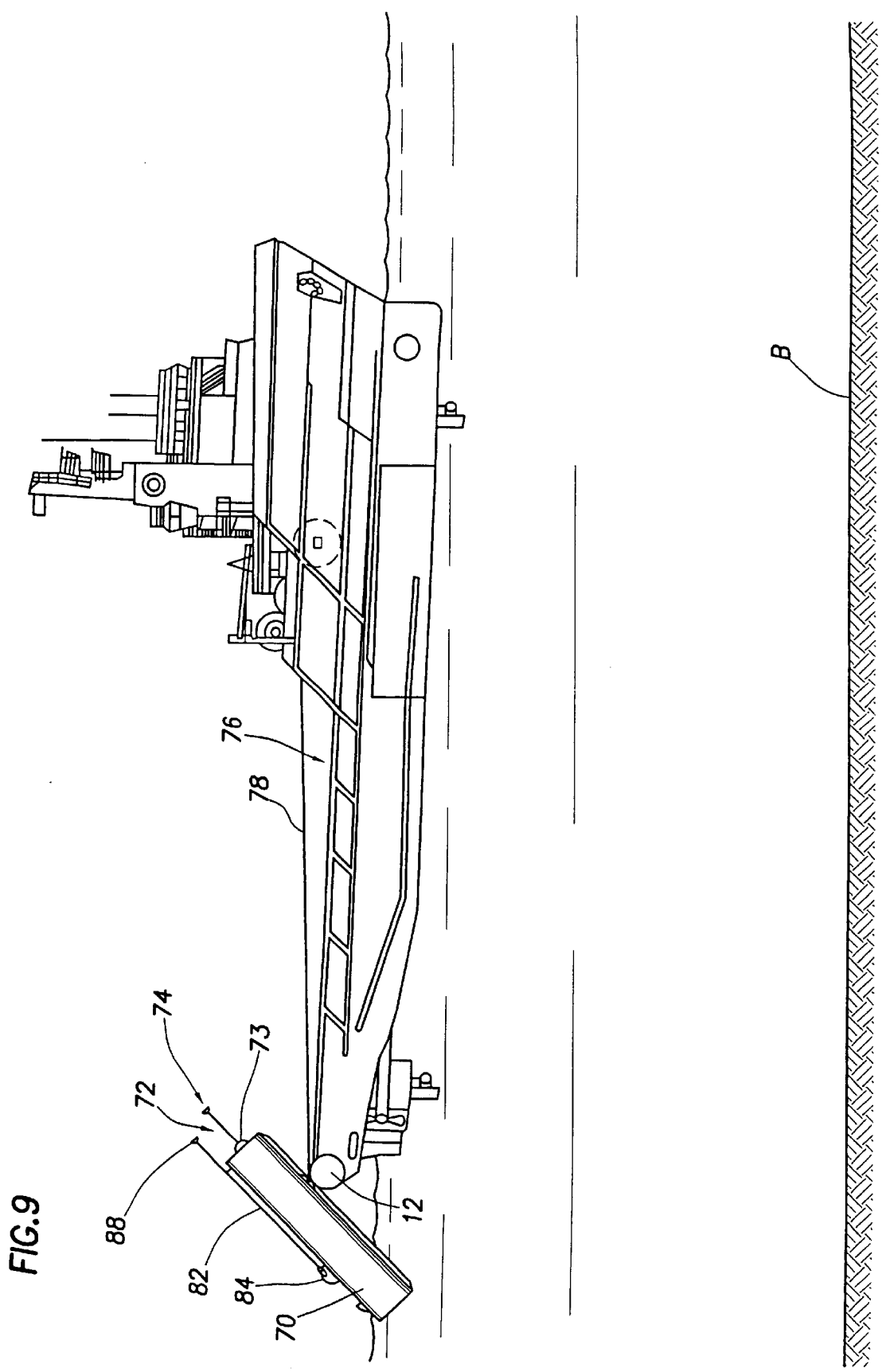
FIG. 9 is a side elevational view similar to that of FIG. 8 and showing overboarding of the suction anchor pile and also showing the relationship of the handling lines to the anchor handling vessel and the suction anchor pile.
Figure 10:
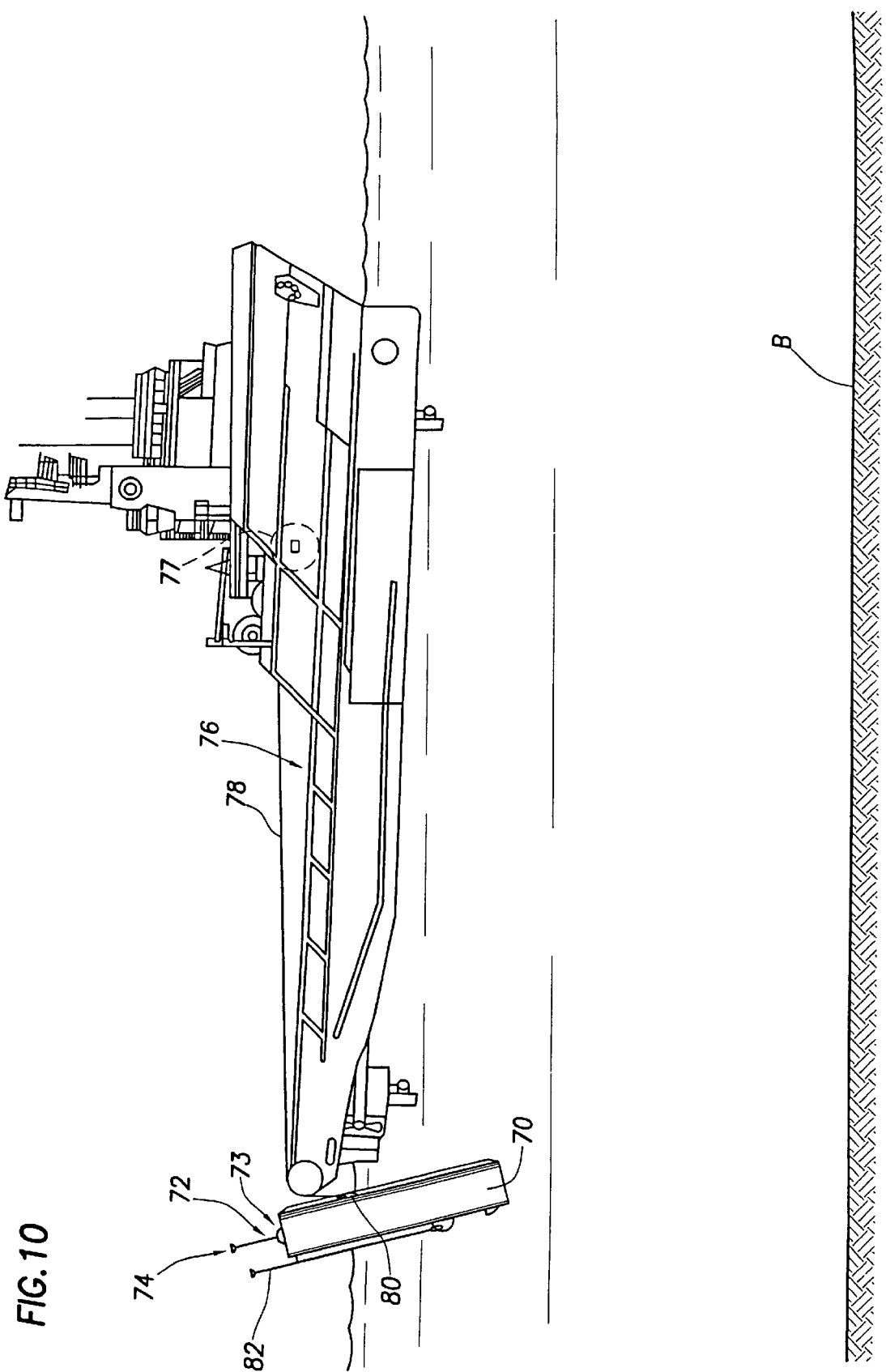
FIG. 10 is a side elevational view similar to that of FIG. 9 and showing the suction anchor pile leaving the stem roller of the vessel in route to its proposed site in the sea floor.
Figure 11:
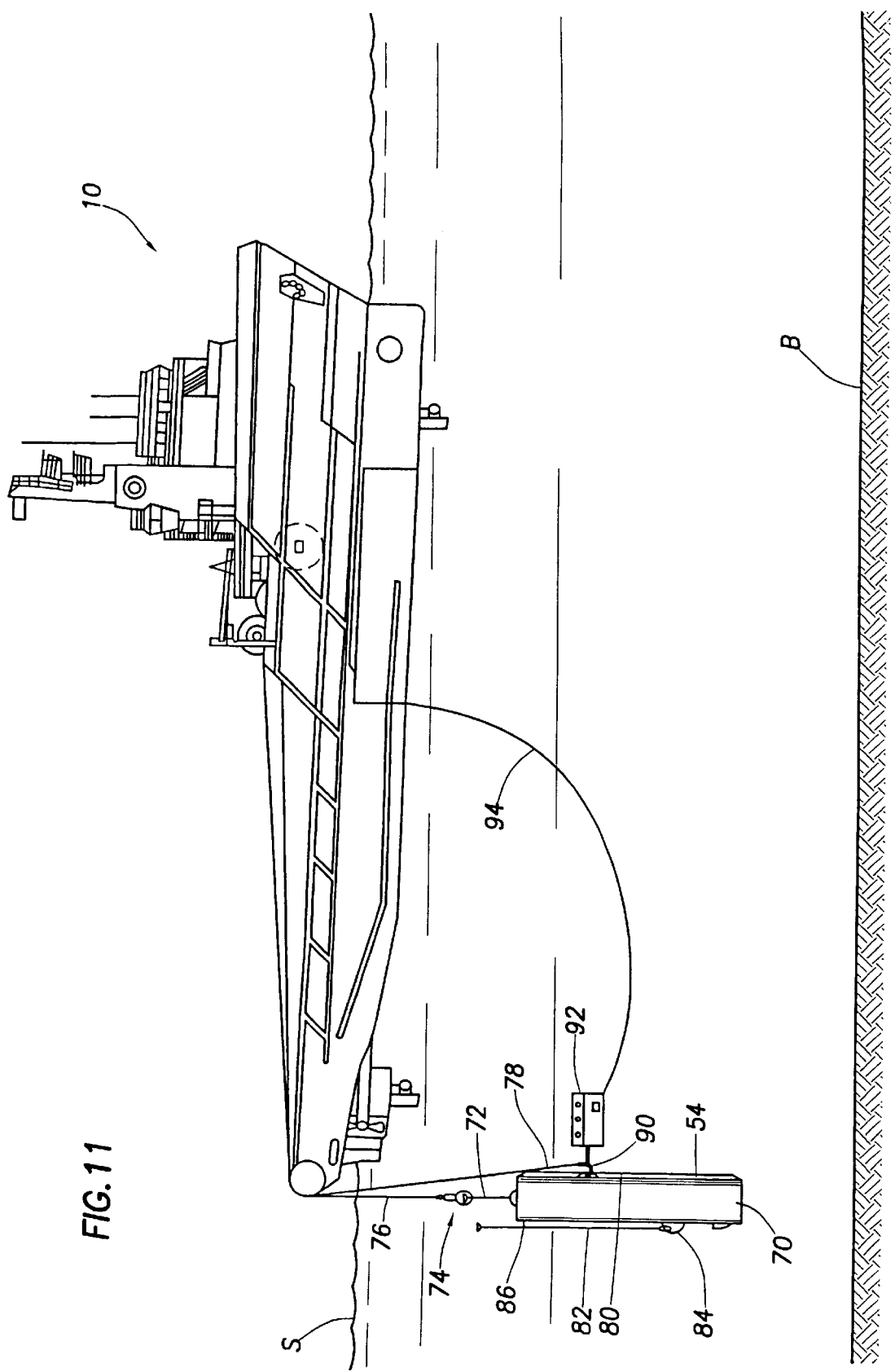
FIG. 11 is a side elevational view similar to that of FIG. 10 and showing the suction anchor pile just under the stem of the vessel and further showing disconnection of the overboarding hook from the sling of the suction anchor pile by remote operating vehicle (ROV) handling.

From the position of the suction anchor pile shown in FIG. 8, the suction anchor pile is moved over the stem roller 12 until such a time as its weight is supported by the winch line 76 via the socket connector 74 and the lifting and handling sling 72 as shown in FIG. 9. Movement of the suction anchor continues as shown in FIG. 10 until its weight is largely supported by the overboarding sling 80 and the support for the anchor begins to transfer from the winch line 78 to the lifting and lowering or deployment winch line 76 of the lifting and lowering winch 77. As shown in FIG. 11, the suction anchor pile is located just under the stern of the anchor handling vessel and its weight is supported by the winch line 76 via the socket connector 74 and the deployment sling 72. At this point, the winch line 78 is not needed and thus its overboarding hook 90 can be disconnected from the overboarding sling 80. A remote operating vehicle (ROV) 92 shown in FIG. 11, may be utilized to manipulate the overboarding hook and release it from the overboarding sling. The ROV is operationally and controllably coupled with the vessel 10 via a power and service cable 94 under control by personnel of the vessel.

Figure 12:
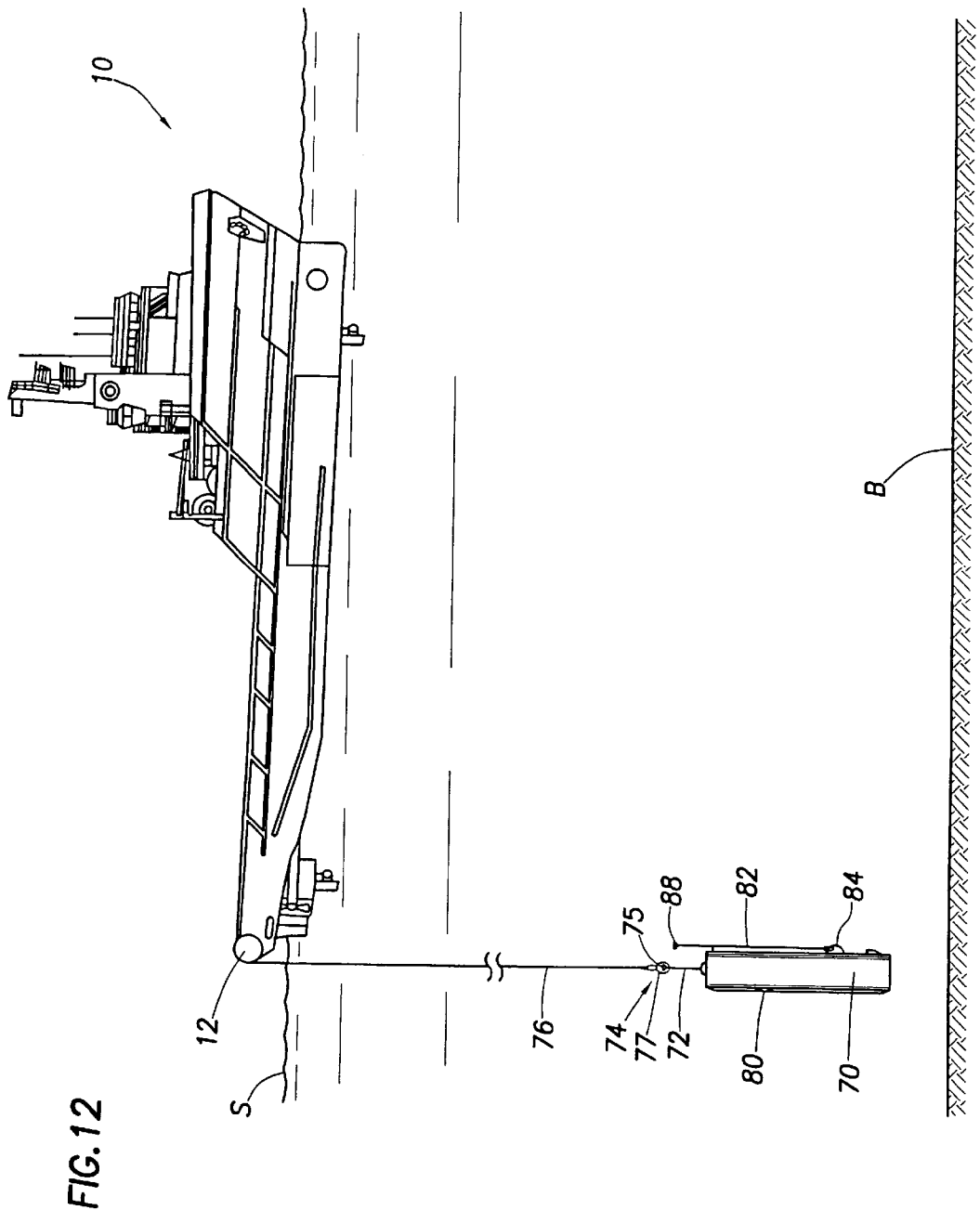
FIG. 12 is a side elevational view similar to that of FIG. 11 and showing the suction anchor pile being lowered with a mooring wire to a point near the sea floor.

As shown in FIG. 12 the anchor device 70 is lowered to the sea bottom B using the anchor handling winch line 76, with the connection between the winch line and the anchor device being provided by a releasable connector shown generally at 74. A deployment sling 72 for anchor handling extends upwardly from the anchor and is connected centrally of the upper end of the anchor so that the anchor will be suspended in a desired orientation for embedment within the sea bottom B. The deployment sling 72, with its socket connector element 75, projects upwardly above the upper end of the anchor device, thus positioning the socket connector element 75 in position for being received by a socket body of the connector 74, such as a socket body of the type shown in FIGS. 21, 22 and 23 hereof.

Figure 13:
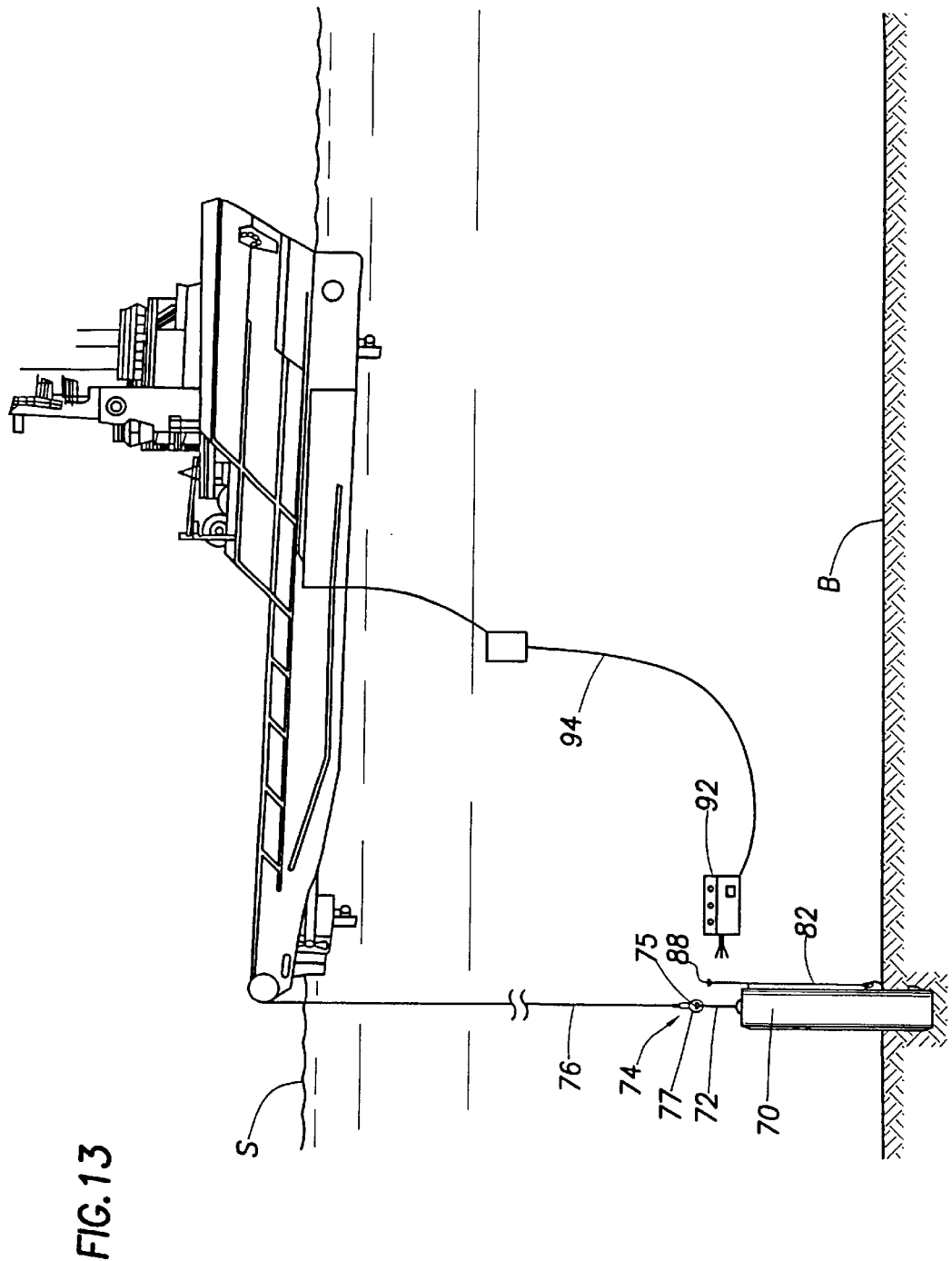
FIG. 13 is a side elevational view of the anchor handling vessel similar to that of FIG. 12 and showing self-penetration of the suction anchor pile into the sea floor with the ROV monitoring and directing orientation of the suction pile and having the capability to assist in suction pile installation.
Figure 14:
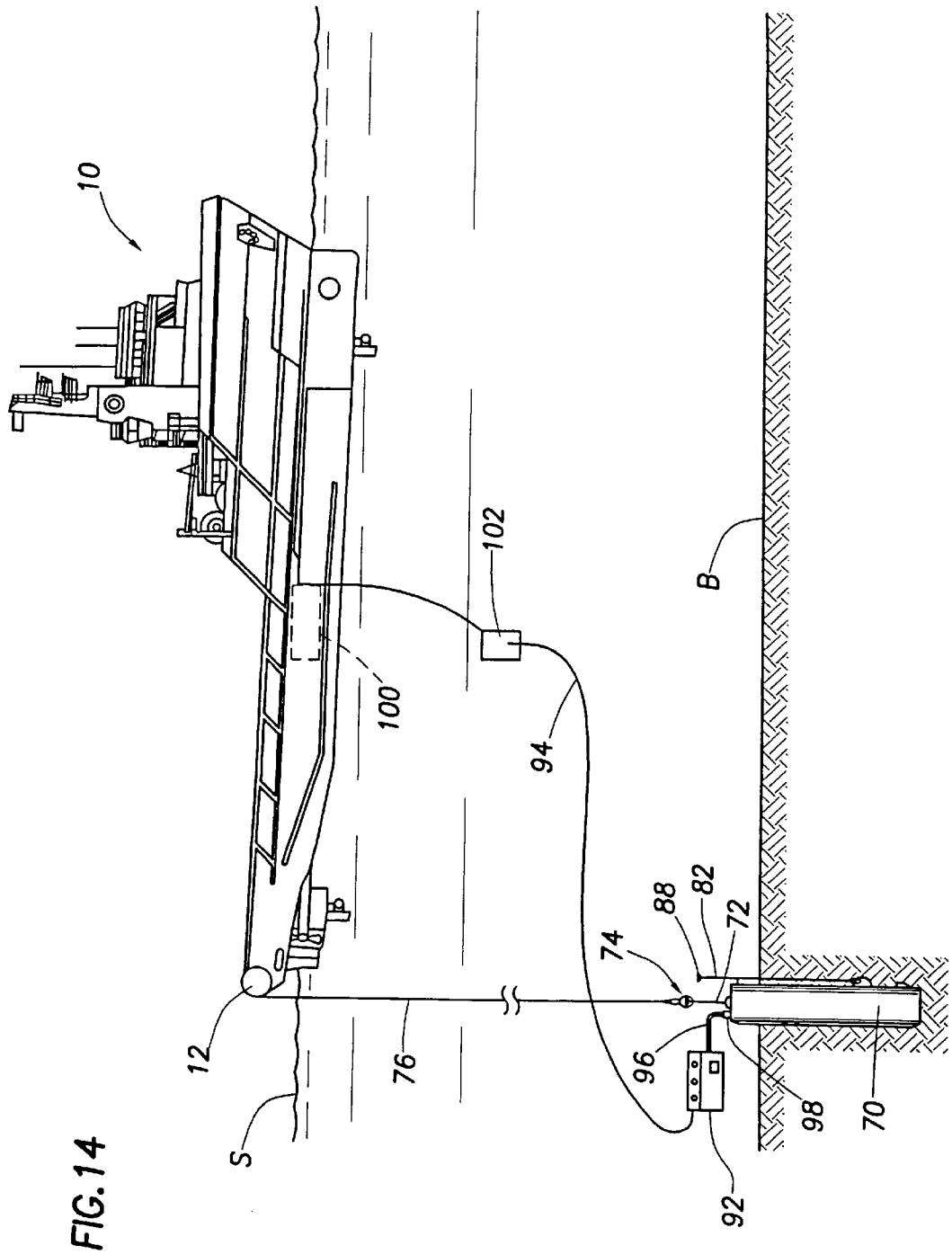
FIG. 14 is a side elevational view similar to that of FIG. 13 showing a further step in suction anchor pile deployment as water is evacuated from the suction anchor pile by the ROV.
Figure 15:
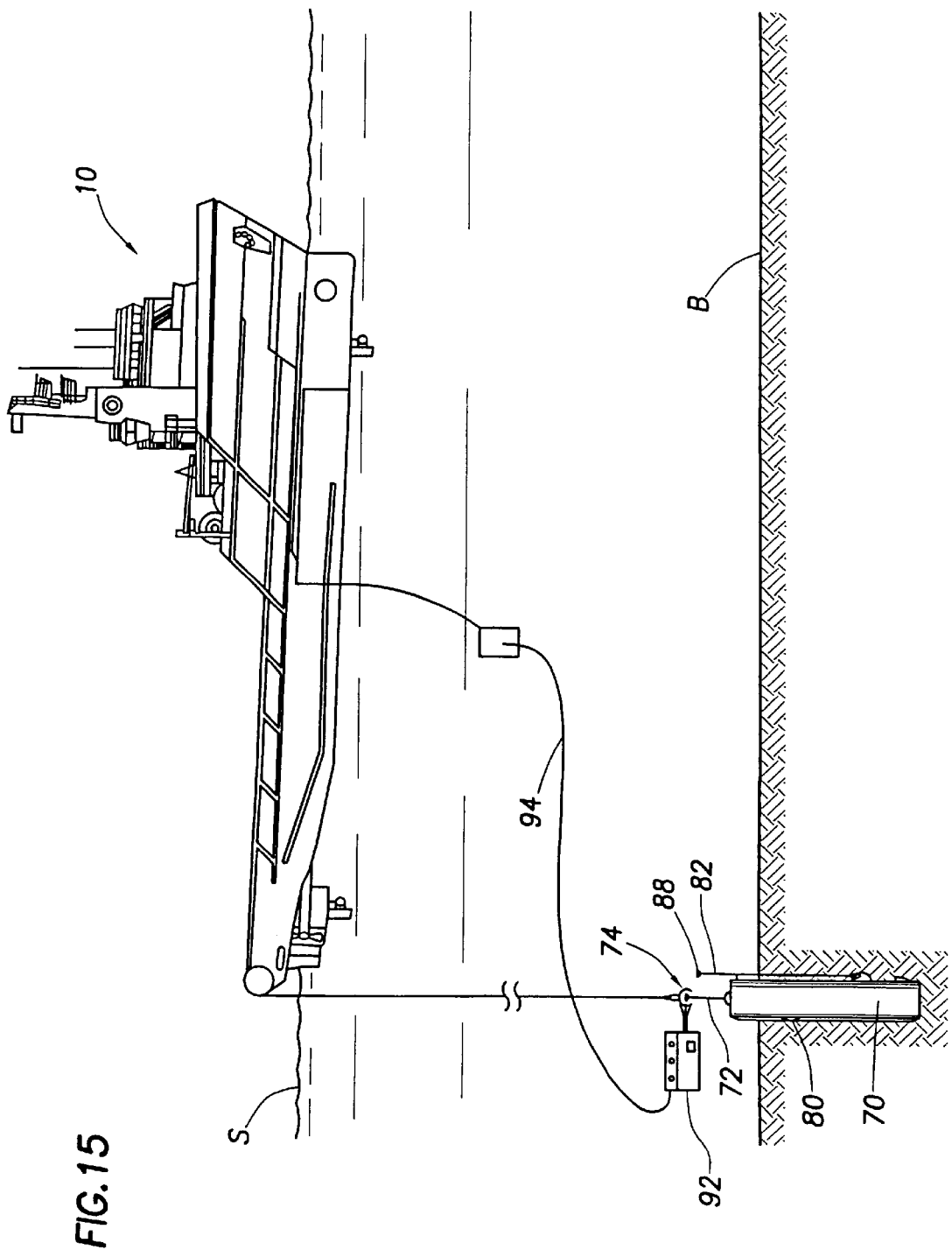
FIG. 15 is a side elevational view similar to that of FIG. 14 showing the suction anchor pile fully deployed and showing release of the hook of the lowering line from the suction anchor pile by ROV assistance.
Figure 16:
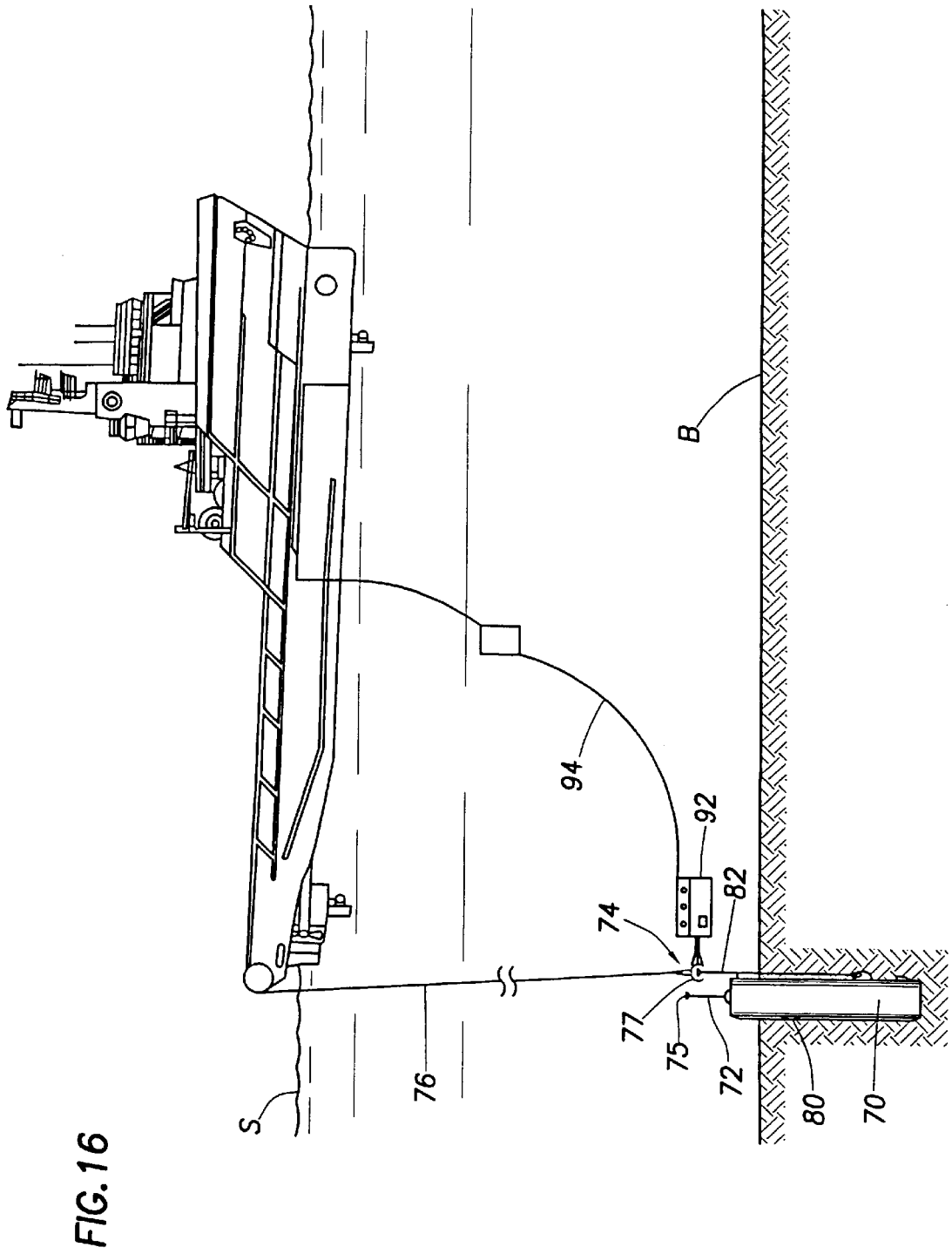
FIG. 16 is a side elevational view similar to that FIG. 15, showing the suction anchor being connected to the main mooring extension wire which is suspended substantially vertically from the vessel to the suction anchor and showing movement of the lowering/mooring wire from the suction anchor pile support and reconnection of the mooring wire to the main mooring wire extension of the suction anchor pile.

When the anchor device 70, in this case a suction anchor, reaches the sea bottom B as shown in FIG. 13, the anchor device will penetrate the soft silt of the sea bed by the force of its weight. Typically in deep water conditions, a ROV 92 is controlled by the anchor handling vessel and moves to position its fluid transfer line 96 in assembly with the fluid transfer connection 98 of the anchor device 70, as shown in FIG. 14. The ROV 92 will then be energized to evacuate water from the interior of the suction anchor device, causing it to penetrate the sea bottom to a desired extent as shown in FIG. 14. Alternatively, a remotely operated connector having connection and releasing capability may be employed to accomplish mooring line connection with or release from an anchor device. With the anchor embedded in the sea bottom to its full extent, the lifting and handling or deployment sling 72 will position the socket connector element 75 above the sea bottom. At this point the mooring wire extension 82, which is typically connected to the side of the anchor device and at a location on the lower portion of the anchor as shown in FIGS. 14, 15 and 16, will be upstanding along the side of the anchor device for positioning the wire socket element 88 thereof above the sea bottom B and at a location offset laterally from the deployment sling 72 and its wire socket element 75. Then, as shown in FIGS. 15 and 16, when the winch line 76 is to be used as a section of mooring line, the ROV 92 can shift the socket body 77 of the connector 74 from the wire socket element 75 to the wire socket element 88 of the mooring wire connector or extension 82. In cases where a separate mooring line is to be used, the deployment winch line 76 can be recovered to the anchor handling vessel 10 and the ROV 92 can be used to establish connection of a connector body 77 of the mooring line with the wire socket member 88 of the mooring wire connector or extension 82. Thus, the anchor device can be installed without any mooring line attached to the mooring connector or extension 82 so that the potential for entanglement of the deployment line and the mooring line during anchor deployment by a single anchor handling vessel is eliminated. Only after the anchor device has been completely installed is the mooring line connected with the anchor device. The present invention also facilitates disconnection and reconnection of mooring lines to anchor devices, if and when desired, to facilitate efficiency and flexibility of vessel mooring. After a mooring line has been connected to the mooring connector of an anchor device, the mooring line may be immediately connected to the mooring system of the vessel, if the vessel is present, or it may be deployed at the sea bottom in readiness for connection with the mooring system of the vessel at a later time.

Figure 17:
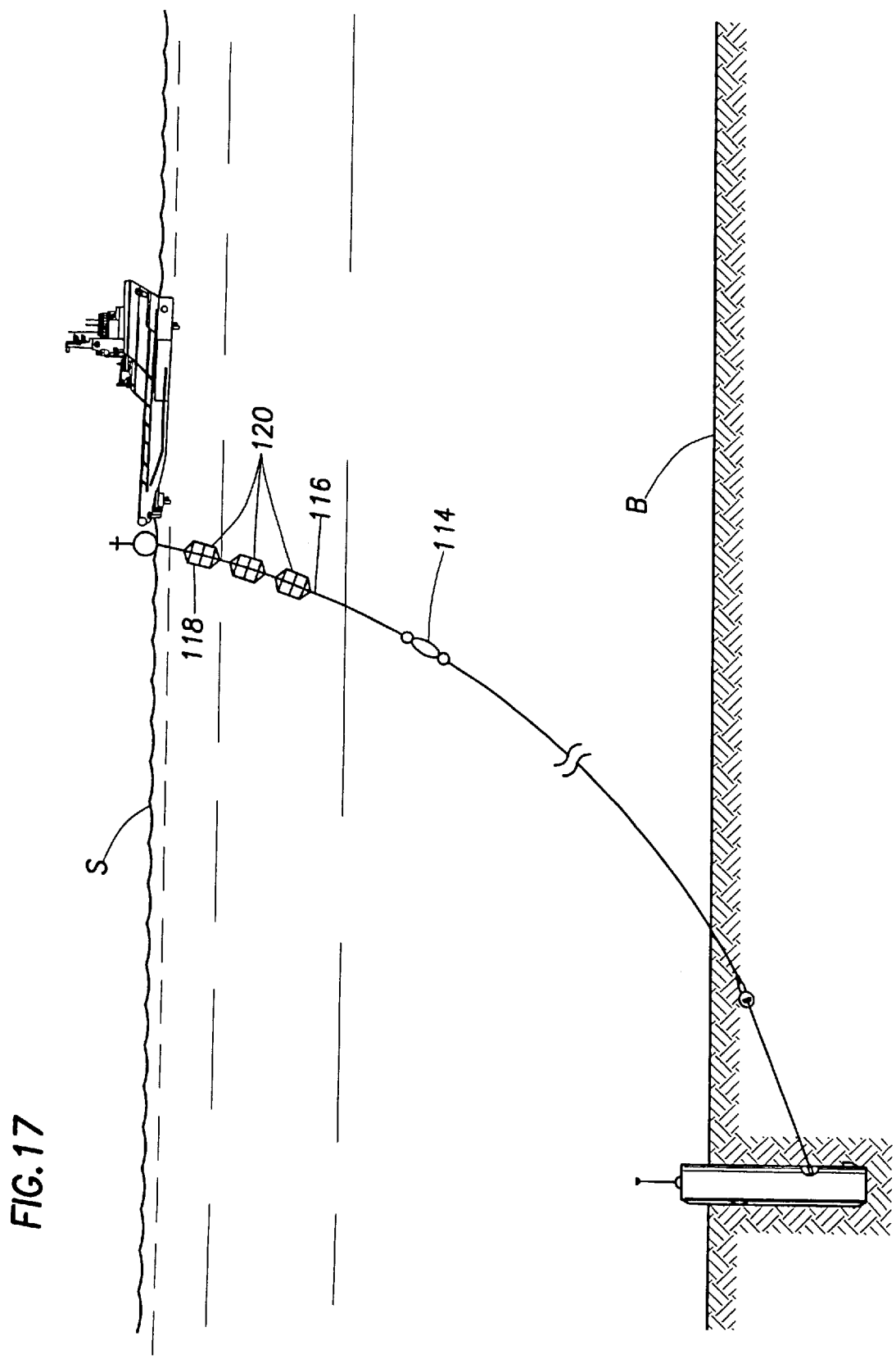
FIG. 17 is a side elevational view similar to that of FIG. 16, showing intermediate mooring wiring installed in connection with the suction anchor mooring wire and showing subsurface buoys being connected to the intermediate mooring wire and also showing a surface buoy, if needed, being connected to the intermediate mooring view.
Figure 18:
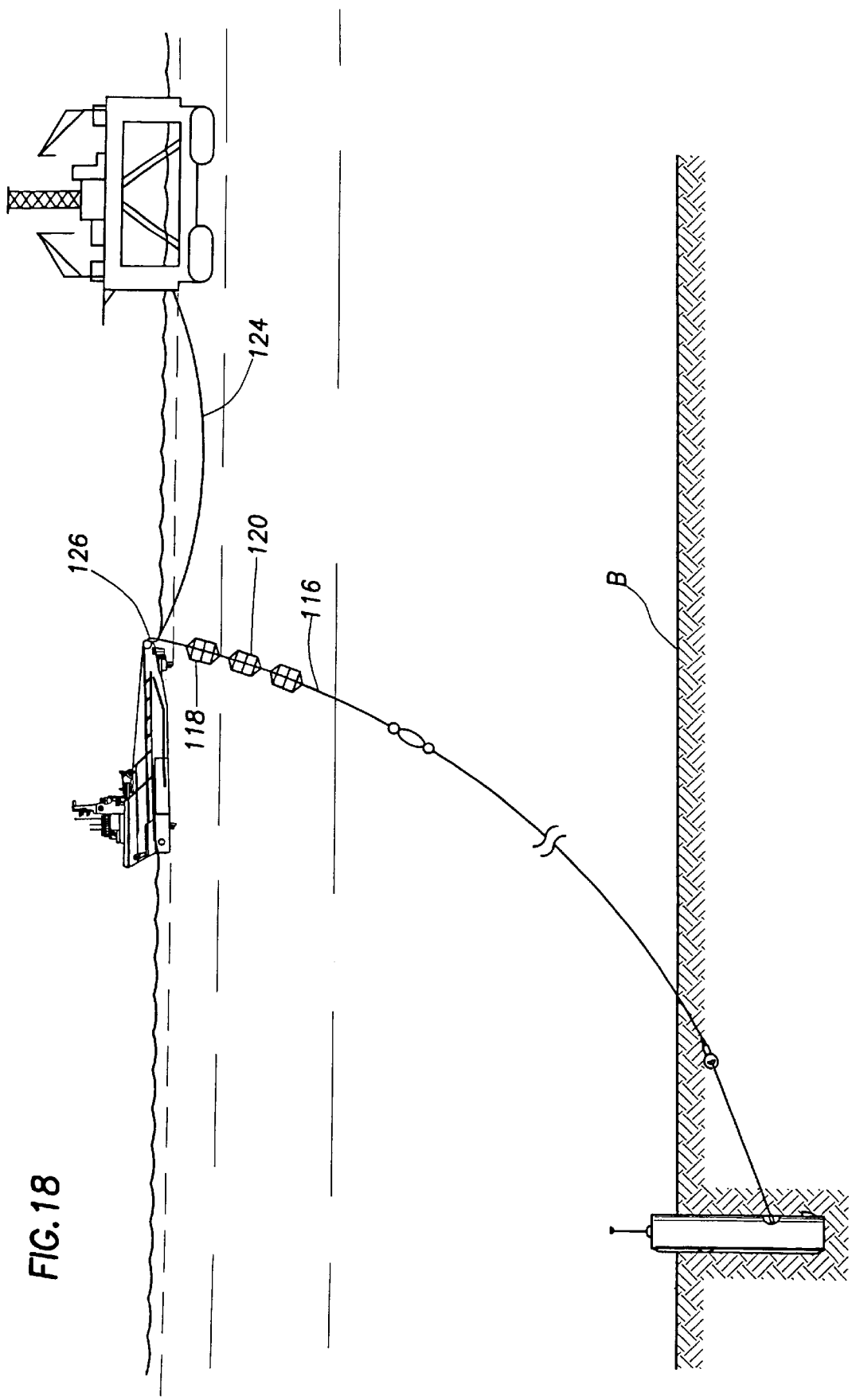
FIG. 18 is a side elevational view similar to that of FIG. 17 a semi-submersible drilling vessel, mobile offshore drilling unit (M.O.D.U.), showing the M.O.D.U. being moved to a site where subsurface anchors and mooring wires have been previously deployed and showing an anchor handling vessel recovering the surface buoy connected to a rig wire, utilizing a short section of chain and also installing a J-chaser stopper device in the mooring wire system.
Figure 19:
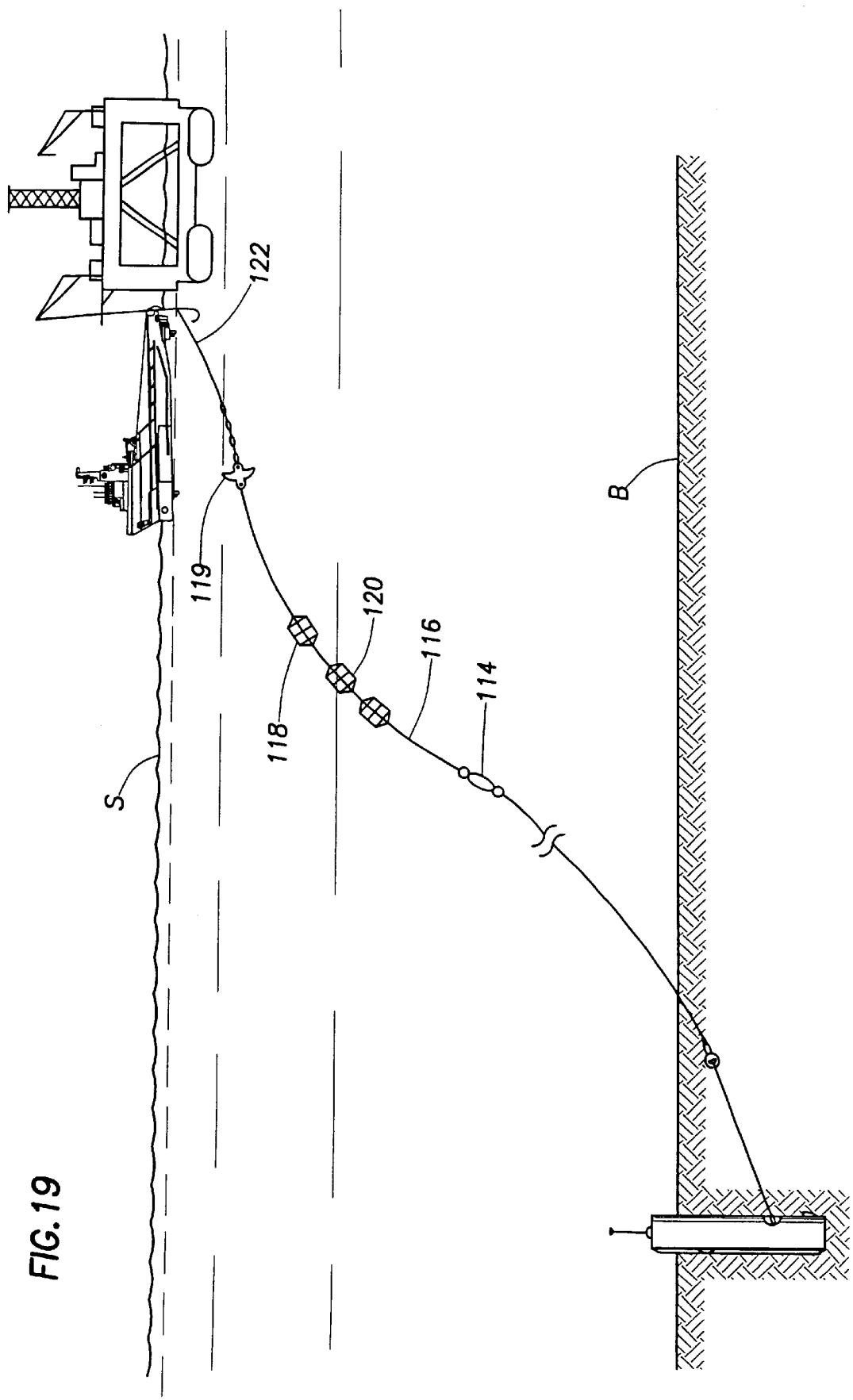
FIG. 19 is a side elevational view similar to that of FIG. 18 showing the anchor handling vessel winch wire lowering a mooring string utilizing a J-lock chaser device, with the J-lock chaser device being stripped back to the M.O.D.U., i.e., rig until free.

After the primary mooring wire has been deployed, as shown, with its syntactic buoy positioning the terminal end for recovery, the ROV 92 and lowering and heaving wire 76 with its lowering hook 90 will be recovered to the anchor handling vessel. After this has been done, the anchor handling vessel is loaded with wire and buoys for rig connection and the ROV 92 functions to connect the hoisting and lowering wire 76 with its hook 90 to a connector of the mooring line as shown in FIG. 18. From the condition shown in FIG. 18, the primary mooring wire section, which can be the deployed anchor handling line 76 is hoisted to the anchor handling vessel and is pulled over the stem roller of the vessel as shown. With the terminal end of the primary mooring wire located on the anchor handling vessel, an intermediate section 116 of mooring wire is connected to the primary mooring wire section by a connector 114. The intermediate mooring wire section 116 is then provided with one or more buoys as shown at 118 and 120 for supporting the intermediate mooring wire 116 and for providing the completed mooring line assembly with buoyant support intermediate its length. After the buoys 118 and 120 have been attached to the intermediate mooring wire 116, as shown in FIGS. 17 and 18, a winch line of the anchor handling vessel, which is connected to the intermediate mooring wire 116 above the uppermost buoy 118, will be paid out from the anchor handling vessel to thus allow the vessel to back into the rig to receive the mooring wire 124 of the rig. The mooring wire of the rig will be paid out from its winch so that, after its connection to the intermediate mooring wire 116, the mooring wire installation from the rig to the suction anchor pile can be controlled by the on-board winch of the rig. At this point of the mooring operation, as shown in FIGS. 18 and 19, the upper winch wire 122 of the anchor handling vessel is heaved to a position adjacent the stem of the vessel to expose the mooring wire section at a connector 126 that is located immediately above the connection. The rig mooring wire 124 is then connected to the intermediate mooring wire section 116 at a connector 126 that is located immediately above the upper buoy 118 of the intermediate mooring wire, as shown in FIG. 18. The mooring wire installation is completed by lowering the rig mooring wire 124 and the intermediate mooring wire 116 with its buoys by a winch line 126 having a J-chaser 128 connected thereto as shown in FIG. 19. When the mooring wire installation reaches its proper catenary, the J-chaser will simply become unhooked from the mooring wire and may then be recovered to the vessel. The mooring wire winch system of the vessel will then adjust the mooring wire assembly as is proper stationing of the rig at its proper location relative to the sea floor B.

When it is appropriate to disconnect the rig from its mooring wire installation, the anchor handling vessel 10 will position its heaving wire with the J-chaser 128 in contact with the mooring wire 124 of the rig. The anchor handling vessel will then move away from the rig, thereby causing the J-chaser 128 to move along the rig mooring wire 124 until it comes into contact with a short chain located immediately above the upper buoy 118 of the intermediate mooring wire section. After this has been done, the heaving line and J-chaser is heaved to a position exposing the short recovery chain above the upper buoy 118 and thus also exposing the connection between the rig mooring wire 124 and the intermediate mooring wire 116. The rig mooring wire 124 is then disconnected from the intermediate mooring wire 116 at the vessel deck and is recovered to the rig by the rig winch system. It should be borne in mind that the connector 126 for making the connection of the rig mooring wire 124 with the intermediate mooring wire, may be in the form of a quick release type socket connector. In fact, each of the connectors along the length of the mooring wire installation may be defined by wire socket connectors, if desired, or may take the form of any other suitable mooring wire connector without departing from the spirit and scope of the present invention. After the rig mooring wire has been disconnected and recovered, the anchor handling vessel will lower a subsea retrieval tool to a depth below the lower buoy 120 shown in FIGS. 18 and 19 and will then connect the subsea retrieval tool to the intermediate mooring wire 116 below the buoys. The ROV 92 can be utilized for this purpose. The subsea retrieval tool is then heaved to the deck of the vessel thereby causing the buoys 118 and 120 to be decked without damage because the weight of the intermediate mooring wire 116 will not be present on the buoys are as they are heaved over the stern roller of the anchor handling vessel. After the buoys have been secured on deck, the intermediate mooring wire section 116 is then recovered by the anchor handling vessel. After the intermediate mooring wire section has been recovered to the anchor handling vessel, as shown in FIG. 18 so that the mooring line connector 114 is located on the deck of the vessel, the connector will be disconnected and the vessel crew will reinstall a conventional syntactic foam buoy with a deployment/recovery sling (not shown) and begin to deploy the primary mooring wire section 76 to the ocean bottom. The syntactic foam buoy, connected to the primary mooring wire section, the primary mooring line is then lowered to the sea floor B by the winch wire 78 and deployment and recovery hook 90. The ROV 92 is deployed from the anchor handling vessel 10 and is used to disconnect the deployment recovery hook 90 of the winch wire from the sling above the syntactic buoy. After the hook 90 has been disconnected from the sling, the winch wire 78 and deployment/recovery hook 90 are then recovered to the anchor handling vessel, leaving the primary mooring wire 76 lying on the sea floor with its terminal end being positioned above the ocean bottom by the syntactic buoy so that its sling will be positioned for immediate reconnection to the intermediate mooring wire section 116 as needed. After this has been done, the anchor handling vessel can then proceed to the rig as shown in FIGS. 18 and 19 to repeat the section anchor pile and mooring line installation for another one of the plurality of suction anchor pile and mooring line assemblies of the rig mooring system.

It may be appropriate at some point to recover the suction anchor pile 70 so that it may be reinstalled at some other location as may be desired for different stationing of the rig relative to the sea floor B. This is accomplished by connecting a vessel winch line to the heaving sling of the primary mooring wire 76 and heaving the primary mooring wire onto the anchor handling vessel until it is oriented substantially vertically above the suction anchor pile 70. With the primary mooring wire so positioned, the ROV 92 is then utilized to essentially pivot the mooring wire connector extension 82 about its connection 84 with the pile so that it enters an entrapment slot 83 of the suction anchor pile. The ROV will then manipulate a lock on the suction anchor pile to secure the mooring wire extension 82 within the entrapment slot 83, so that the mooring line extension 82 is retracted to its subsequent vertical orientation. After this has been accomplished, the ROV 92 will be moved to the subsea connector 74 and will disconnect the connector from the mooring wire connector extension 82. Since the mooring wire connector extension 82 will be locked within the entrapment slot of the suction anchor pile, it will remain substantially vertically oriented with its socket element 88 positioned for subsequent reconnection to a mooring wire section in simple and efficient manner. The ROV will then move the subsea connector 74 from the socket 88 of the mooring wire extension 82 to the anchor lift sling 72 in preparation for lifting the suction anchor pile to the deck of the anchor handling vessel. Then the ROV 92 will be maneuvered for connection of its fluid transfer line 96 with the fluid transfer connection 98 of the suction anchor pile. The pumps on the vessel are then energized, forcing water through the connection 98 into the suction anchor pile and thus developing a differential pressure induced force that moves the suction anchor pile upwardly. Simultaneously, a heaving force is applied to the winch wire 76 of the vessel which, through the wire socket connector 74, lifts the suction anchor pile from its embedded relation within the sea floor B until the section anchor pile is located within the 15' silt line of the sea floor B. At this point, the ROV will disengage its fluid transfer conduit 96 from the suction anchor pile coupling 98. After the ROV has been disconnected, the suction anchor pile is heaved upwardly by the winch line 76 until the suction anchor pile is located at a predetermined depth, i.e. about 60' below the anchor handling vessel. With the suction anchor pile 70 stationary below the stern of the vessel, as shown in FIG. 11, the ROV 92 will be utilized to connect a recovery hook 90 of a recovery winch line 76 or 78 as the case may be to the deployment/recovery sling 80 of the suction anchor pile. The recovery winch line 76 or 78 is then heaved moving the suction anchor pile upwardly toward the stern of the vessel and causing the deployment/recovery wire 76 to become slack. Heaving is continued, causing the deployment/recovery sling 80 to pass over the stern roller 12 of the vessel and thus initiating boarding movement of the suction anchor pile over the stem roller as shown. To then assist in maneuvering the suction anchor pile so that it can be decked by a heaving force applied by the winch system to the wire 76 or 78, the vessel is moved forwardly in the water, with the anchor pile positioned as shown in FIG. 10, thus applying a water drag induced force against the lower portion of the suction anchor pile to assist in its pivot-like movement about the stem roller 12. The winch wire 78 will continue movement of the suction anchor pile until it is slowly brought aboard the vessel and is allowed to rest in a cradle that is positioned by the moveable track system that is mounted on the deck of the vessel.

Figure 21:
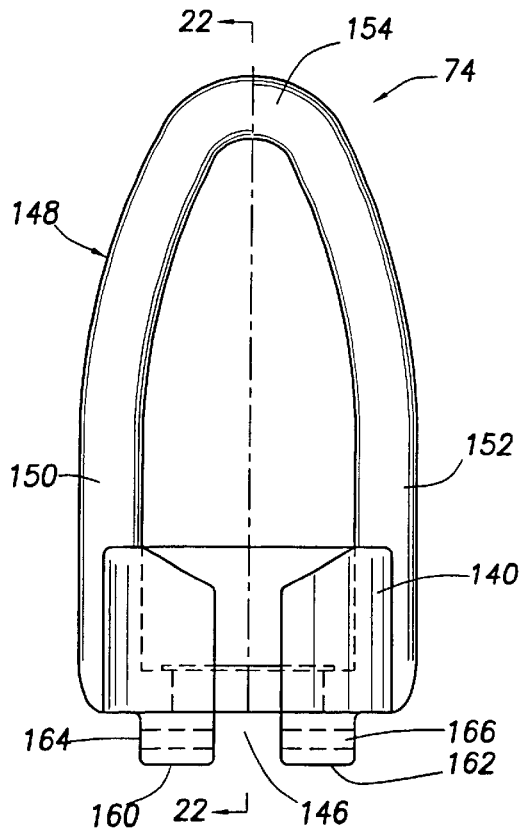
FIG. 21 is a front elevational view of a socket connector that is adapted for connection to a mooring or heaving line and which is adapted to receive a socket that is connected to another line section to thus permit quick and efficient connection and disconnection of mooring line sections.
Figure 22:
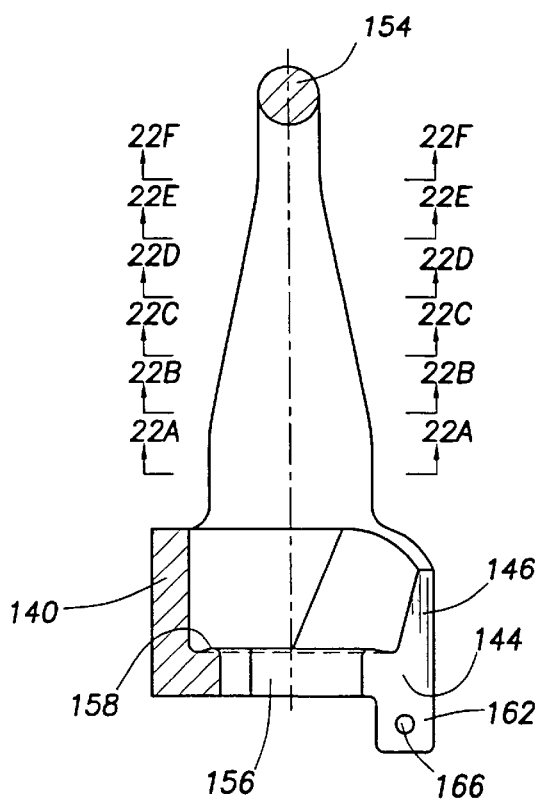
FIG. 22 is a sectional view taken along line 22—22 of FIG. 21 and showing the internal geometry of the socket connector as well as the geometry of the connecting eye thereof.
Figure 22A:
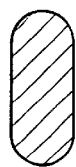
FIGS. 22A—22A through 22F—22F are sectional views taken along respective section lines 22A–22F of the socket connector of FIG. 22 to thereby show the cross-sectional configuration of the connection bail at various locations along the length thereof.
Figure 22B:
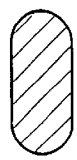
Figure 22C:
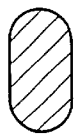
Figure 22D:
Figure 22E:
Figure 22F:

The subsea connector shown generally at 74 may conveniently take the form of a wire socket connector, shown in FIGS. 21–25, which incorporates a basket structure defining a tapered internal receptacle for receiving the tapered wire socket of a wire line or other type of connector device and having a slot through which a line is literally movable. The connector 74 incorporates a wire socket body structure 140 of generally circular cross-sectional configuration having spaced, generally parallel surfaces 142 and 144 which define a wire or connector access opening 146. The generally parallel surfaces 142 and 144 are disposed in generally parallel relation with the longitudinal axis 145 as shown in FIG. 21. A bail structure shown generally at 148 is formed integrally with the wire socket body structure 140 and defines upwardly extending body support arms 150 and 152 that are interconnected at the upper ends thereof by a curved bail section 154 of circular cross-sectional configuration as shown in FIG. 22. The cross-sectional geometry along the length of the connector body support arms 150 and 152 is indicated by sections 22A—22A through 22F—22F as shown in FIG. 22 and in FIGS. 22A–22F.

Figure 23:
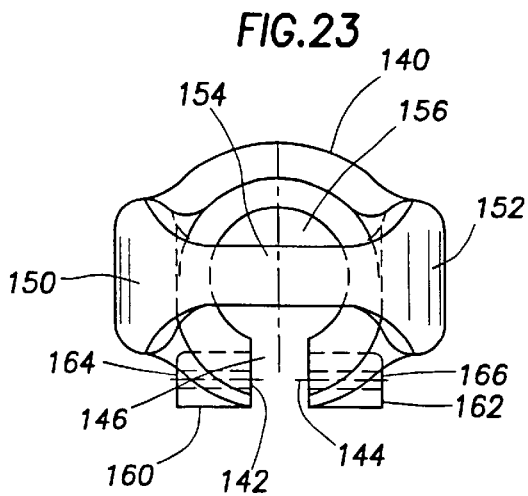
FIG. 23 is a plan view of the socket connector of FIG. 21.
Figure 24:
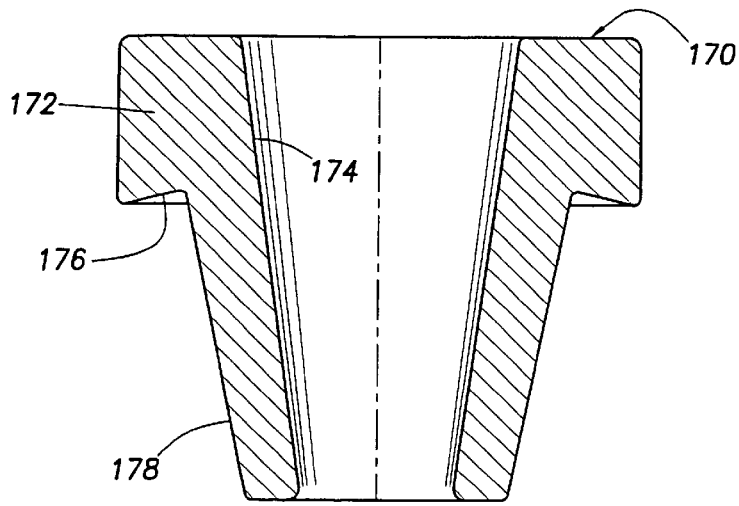
FIG. 24 is a sectional view of a socket element adapted to be fixed to a mooring line or mooring connector by zinc or polymer connection and further adapted for seated assembly within the wire socket connector of FIGS. 21–23.
Figure 25:
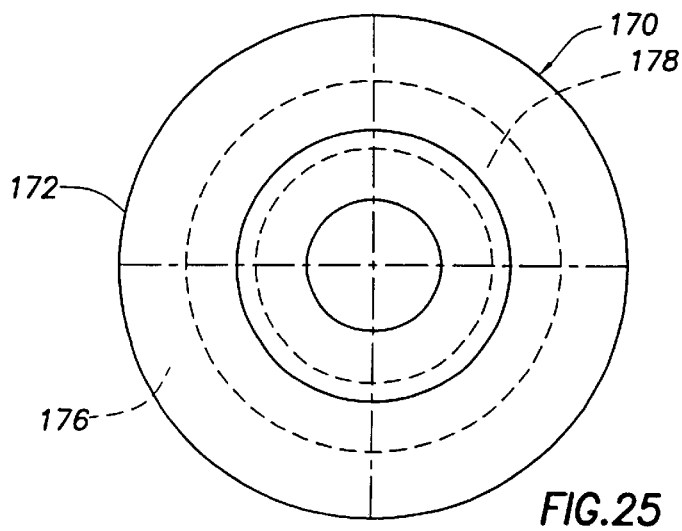
FIG. 25 is a plan view of the socket element of FIG. 24, with undercut and bottom surfaces thereof being shown in broken line.

The connector body structure 140 defines a central socket receptacle opening 156 which is in communication with the wire access opening 146. About the central opening 156 the connector body 140 also defines a reverse angled circular seat shoulder 158 which extends to the wire access opening 146. The conical, reverse angled seat shoulder 158 provides for seating of a wire socket element, such as shown in FIGS. 24 and 25, within the connector body as will be discussed below. The connector body structure also defines a pair of locking tabs 160 and 162 which project downwardly on each side of the wire access opening 146 as is best shown in FIGS. 21–23. These locking tabs define registering through bores 164 and 166 that can receive a bolt, pin or other suitable locking connector for securing a winch line or other force transmitting line, as the case may be, within the central socket receptacle opening 156 of the connector body. The bolt or locking pin may be extended through the registering through bores 164 and 166 by manual operation or by a robot or remote operating vehicle (ROV) in order to present inadvertent disassembly of the wire socket connection assembly in the event the wire line should become slack for any reason.

As shown in FIGS. 24 and 25 a socket member shown generally at 170 is defined by a socket body 172 having a tapered central passage 174 through which a wire line or mooring line extends. The socket body is permanently fixed to the wire line by zinc, cadmium, polymer or any other material that is poured into the through passage and about the wire line in its molten or uncured liquid state and is then allowed to harden or cure to permanently fix the socket member 170 to the wire line. The socket body also defines a circular conical shoulder 172 having the same angle as the reverse angled conical seat shoulder 158 of the socket body 140.

After the wire line has passed laterally through the wire access opening 146, and has located the socket body above or in registry with the central opening 154 of the socket connector body 140, the wire line is lowered in relation to the connector body structure 140 causing a tapered external guide surface 178 of the socket body 172 to guide the socket member 170 into the socket receptacle opening 154, thus causing the conical shoulder 176 of the socket body to seat against the conical shoulder 158 of the connector body structure 140. As linear force is then applied to the wire line, the socket member 170 will be restrained by its seated relation within the socket receptacle of the connector body 140 and the reverse angled conical surfaces 158 and 176 will interact to minimize potential spreading of the connector body by the wire socket member, thus enabling the connector to withstand significant forces such as are encountered during mooring of M.O.D.U.'s and other marine vessels. When connector disconnect is desired the wire socket 170 will become unseated from its supported relation within the wire socket receptacle opening 154 of the connector body 140 simply by its upward or linear movement relative to the connector body structure, depending upon its orientation. After being unseated in this manner, assuming a locking member is not present within the registering openings 164 and 166, the wire line and wire socket are moved laterally relative to the connector body structure 140 thereby causing the wire to exit laterally from the receptacle opening via the wire access opening 146. It should be borne in mind that the wire socket connector shown in FIGS. 21–25 may be of other configuration as desired, it being appropriate only that it have the capability of being quickly assembled and disassembled particularly in a remote environment such as the subsea environment and perhaps with the use of a ROV or other actuating mechanism for controlling relative movement of the connector body and wire socket structures for accomplishing quick and simplified connection or disconnection thereof.

When force is applied by urging the socket connector relative to the wire socket, which occurs as lifting or mooring force is applied to the socket connector of FIGS. 21–25, the mating tapered reverse angled shoulder surfaces 158 and 176 of the wire socket body and wire socket develop a resultant force which is directed radially inwardly rather than radially outwardly as is typical of conventional wire socket connectors. When conventional tapered wire socket connectors are employed, application of seating force of the wire socket within the connector body places the body structure under hoop stress. When the hoop stress is of high magnitude, the conventional connector body structure can become radially yielded to the point that it may split. According to the principles of the present invention, the inwardly directed resultant force developed by the mating reverse angled shoulder surfaces 158 and 176 under load, minimizes the potential for hoop stress induced yielding or splitting of the socket body and thus enhances the load carrying characteristics of the wire socket connector mechanism of the present invention.

In accordance with the preferred method of deployment of the preferred embodiment, the suction anchors will be deployed in the manner set forth above in connection with FIGS. 8–15. No mooring wires will be installed. The anchor handling vessel may return at a later time with mooring wires and accomplish installation of all of the main mooring wires of the stationing system. If needed, sub-surface marker buoys can be inserted into the mooring string to relieve the weight of the interconnected mooring components. Once all mooring components have been installed, a surface suspension/market buoy 123 is installed as shown in FIG. 17.

Figure 20:
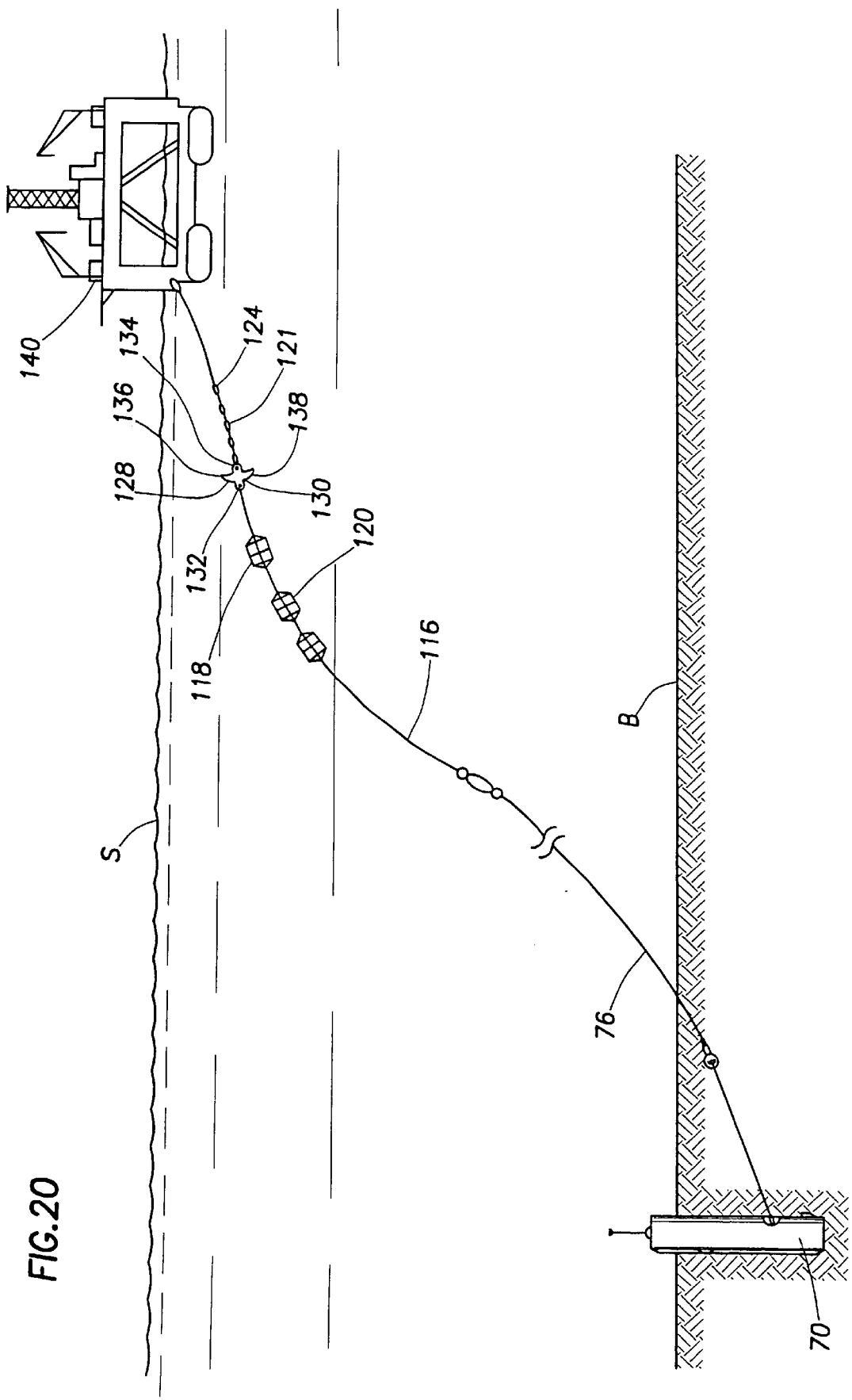
FIG. 20 is a side elevational view similar to that of FIG. 19 showing final connection of the mooring string to the rig.

The mobile offshore drilling unit, "rig" 139 is then moved to the stationing site or location as shown in FIG. 20. The surface buoys are recovered and the mooring wires are attached to the rig mooring wires 76 and 116 which are connected to the mooring wire handling system of the rig, with short sections of chain 121 inserted between the predeployed mooring wires 76 and 116 and the rig mooring wires 124. A J-chaser stopper device 128 is then installed in each mooring string by connecting the J-chaser stopper device to the short section of deploy/recover chain. The J-chaser stopper device 128, as shown in FIG. 20, has a body structure 130 defining a first stopper connector 132 for connection to the mooring line 116, typically above the buoys 118 and 120, and a second stopper connector 134 for connection to the short length of deployment/recovery chain 121. The chain 121 is connected to the mooring line 124 of the buoyant marine structure, MODU or rig 139. From the body structure 130 a pair of hook-like projections 136 and 138 extend laterally to provide for catching the J-chaser in the event it should pass over the chain 121 without becoming mechanically engaged with one of the links of the chain.

The connected mooring string is lowered beneath the surface with a J-Chain Chaser (Locking Style). Once the mobile offshore drilling unit has accepted the weight of the mooring string, the J-Chain Chaser is forced by the anchor handling vessel to slide along the rig mooring wire until it is free. This mooring line attachment is now complete and is in the form shown in FIG. 20.

The preferred embodiment of the present invention is shown pictorially in FIGS. 17–20. In FIG. 17 the mooring wire is shown to be extended from an installed suction anchor and with a quick-disconnect connector device 114 interconnecting an intermediate mooring line with the main mooring line. After the intermediate mooring wire 116 has been installed, as shown in FIG. 17, at least one and preferably a plurality of syntactic buoys 120 are connected to the intermediate mooring line to thus provide for its positioning below the sea surface S but in position for efficient recovery when disconnected from the mooring line of the mobile offshore drilling unit or other vessel shown generally at 11. If desired, a surface buoy 123 be installed at the upper end of the intermediate mooring line 116 so as to provide means for simple and efficient location of the mooring line.

When the mobile offshore drilling unit, M.O.D.U. 11, has been moved to the mooring site or location, it is then necessary to connect the preinstalled moorings. The anchor handling vessel then recovers the surface buoy and connects to the rig mooring wire as shown in FIGS. 18 and 19, using a short section, 25' or so, of mooring chain 121. At this time the anchor handling vessel then installs a J-chaser stopper device 128 in the mooring string, the J-Chaser Stopper being connected to the mooring line of the rig by the short section of chain 121. As shown in FIG. 19, the anchor handling vessel winch wire is utilized to lower the mooring string, utilizing a J-lock chaser. The J-lock chaser is then stripped back to the drilling vessel until free of the mooring wire. FIG. 20 illustrates the final mooring connection between the suction anchor and the drilling vessel. A plurality of mooring strings such as is shown in FIG. 20, typically eight, are utilized to properly station the mobile offshore drilling unit.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims of an issued patent based hereon rather than the foregoing description, and all changes which come within the meaning and range of equivalence of such claims are therefore intended to be embraced therein.

What is claimed is:

1. A method for deployment of a mooring system having one or more mooring anchors and mooring lines for a buoyant marine structure, comprising the steps of:

deploying a mooring anchor to a water bottom, said mooring anchor having a mooring connection for connecting said mooring anchor with a mooring line of a buoyant marine structure;

after deployment of said mooring anchor, deploying a mooring line comprising a quick-disconnect connector for releasable connection with said mooring connection of said mooring anchor; and performing a subsea connection of said quick-disconnect connector of said mooring line, with said mooring connection of said mooring anchor.

2. The method of claim 1, further comprising the step of selectively positioning said mooring line for connection with said buoyant marine structure.

3. A method for deployment of a mooring system having mooring anchors and mooring lines for a buoyant marine structure and for connecting the mooring lines of the mooring system to the mooring anchors and the buoyant marine structure, comprising the steps of:

providing a vessel having at least one mooring anchor thereon, said mooring anchor comprising:
- a deployment connection for deployment of said mooring anchor, and
- a mooring connection for connecting said mooring anchor with a mooring line of the buoyant marine structure, said vessel having an anchor deployment mechanism incorporating an anchor handling line for deploying said mooring anchor from said vessel to a water bottom;

after deployment of said mooring anchor, deploying a mooring line having a quick-disconnect connector for releasable connection with said mooring connection of said mooring anchor, and connecting said quick-disconnect connector with said mooring connection; and selectively positioning said mooring line for connection with said buoyant marine structure.

4. A method for deployment of a mooring system having mooring anchors and mooring lines for a buoyant marine structure, and for connecting the mooring lines of the mooring systen to the mooring anchors and the buoyant marine structure, comprising the steps of:

providing a buoyant marine structure having at least one mooring anchor thereon, said mooring anchor comprising:
- a deployment connection for deployment of said mooring anchor, and
- mooring connection for connecting said mooring anchor with a mooring line of said buoyant marine structure, said buoyant marine structure having an anchor deployment mechanism incorporating an anchor handling line for accomplishing deployment movement of said mooring anchor from said buoyant marine structure to a water bottom;

after deployment of said mooring anchor, deploying a mooring line having a quick-disconnect connector for releasable connection with said mooring connection of said mooring anchor;

connecting said quick-disconnect connector of said mooring line with said mooring connection of said mooring anchor; and selectively positioning said mooring line for connection with said buoyant marine structure, and selectively tensioning said mooring line.

* * * * *